United States Patent [19]

Andrews et al.

[11] 4,099,254

[45] Jul. 4, 1978

[54] METHOD AND APPARATUS FOR ELECTRONIC COLLATION

[75] Inventors: Donald Richard Andrews, Longmont; Alan Fobes Neel, II; Donald Ward Zegafuse, both of Boulder, all of Colo.

[73] Assignee: International Business Machines Corporation, Armonk, N.Y.

[21] Appl. No.: 729,533

[22] Filed: Oct. 4, 1976

[51] Int. Cl.[2] ........................ G06F 3/12; G03G 15/00

[52] U.S. Cl. ........................ 364/900; 355/14; 355/24

[58] Field of Search ... 364/200 MS File, 900 MS File; 235/151.22; 178/15, 23 R; 355/8, 14, 23, 24, 25, 26, 82; 340/324 B; 360/15, 16

[56] References Cited

U.S. PATENT DOCUMENTS

| | | | |
|---|---|---|---|
| 3,479,451 | 11/1969 | Rugunberg et al. | 178/6.6 |
| 3,536,320 | 10/1970 | Derby | 271/50 |
| 3,575,501 | 4/1971 | Rosenberg | 355/3 |
| 3,889,292 | 6/1975 | Bocek | 360/15 |
| 3,944,360 | 3/1976 | Deetz et al. | 355/14 |

*Primary Examiner*—Gareth D. Shaw
*Assistant Examiner*—Thomas M. Heckler
*Attorney, Agent, or Firm*—F. E. Morris; H. F. Somermeyer

[57] ABSTRACT

A method and apparatus are disclosed for electronic collation of sheets of a recording medium, such as paper, printed on one or both sides from electrical signals received at a printer. For printing multiple sets on one side only, the signals are written into a memory in the order in which they are received. The first set may be printed in the desired page order on a recording medium fed through the printer as the signals are received. Additional sets are printed in the same page order by writing the contents of the memory into the printer as many times as necessary as the recording medium is fed through the printer. For printing multiple sets on both sides, the signals representative of every other page are written into the memory and organized into two ordered sequences. One of these sequences contains the electrical signals representative of each of the pages to be printed on one side of the recording medium and the other sequence contains the electrical signals to be printed on the other side of the recording medium. Within each sequence the order of the signals is such that the signals representative of adjacent pages in the order to be printed are adjacent one another in the sequence. Again, the first set may be printed in the desired page order as the signals are received. Each additional set is printed in the desired page order by writing first one sequence and then the other into the printer with one sequence being written in the opposite page order to that in which the signals are received. While the first sequence is being written, the recording medium to be printed is fed through the printer into a last-in-first-out (LIFO) receptacle along a feed path that effectively turns it over. While the second sequence is being written, it is fed from the LIFO sheet receptacle, back through the printer, to an output receptacle.

47 Claims, 14 Drawing Figures

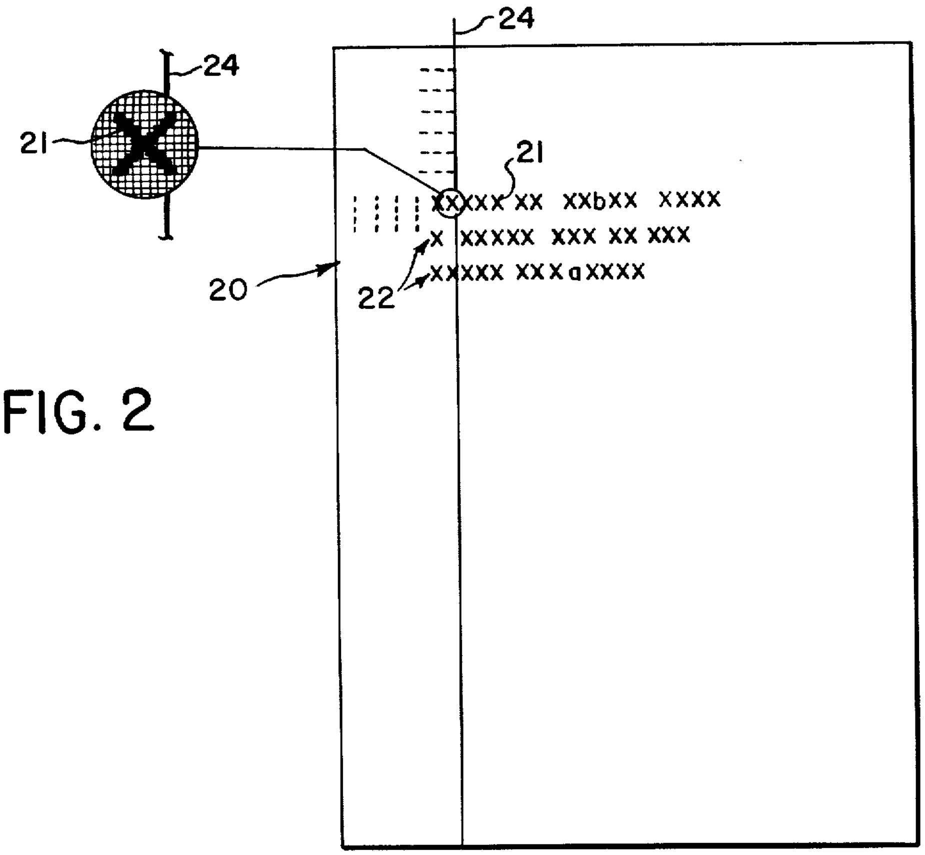
FIG. 2
FIG. 3
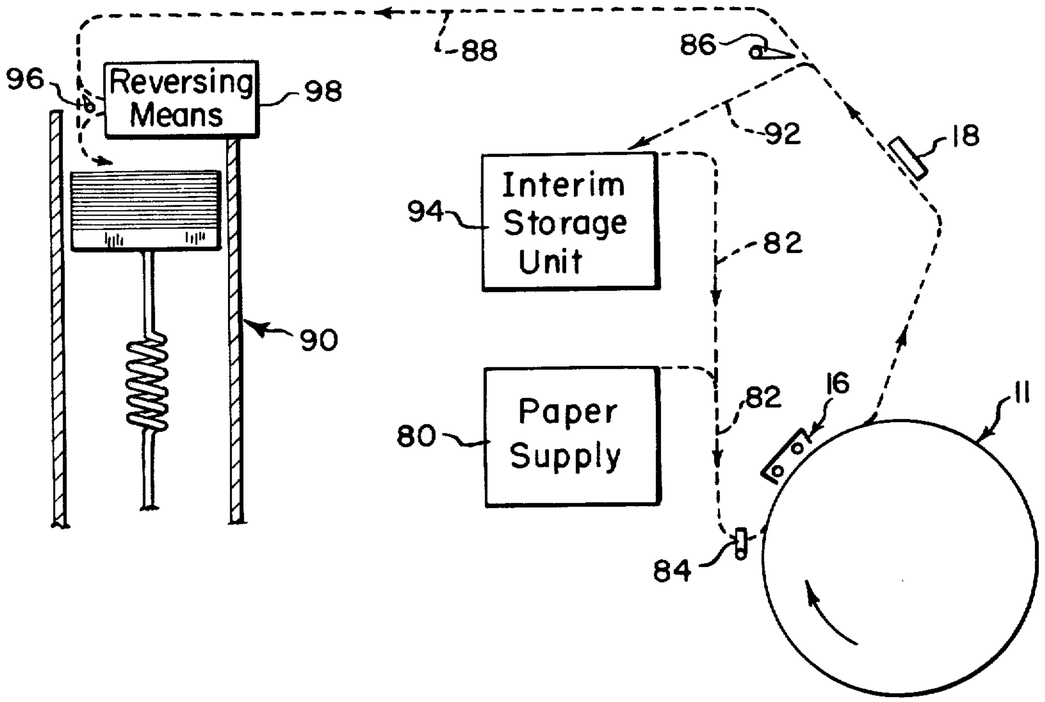

METHOD AND APPARATUS FOR ELECTRONIC COLLATION

BACKGROUND OF THE INVENTION

In numerous electrical-signal-driven printers, signals representative of the visual image on each page to be printed are supplied to the printer in numerical page order. If only one side of a sheet of recording medium is to be printed and only a single copy of each image, each signal is used when received to print the visual image as sheets are fed through the printer. If multiple copies are desired, the electrical signals are inserted when received into some form of a recirculating delay line and the delay line is recycled and read as many times as needed to print the number of copies desired. Printing on only one side of a recording medium is referred to hereinafter as simplex printing.

In many cases it is desirable to print visual images on both sides of the sheet of recording medium in numerical page order as in a book. Such printing is referred to hereinafter as duplex printing. If only one copy is needed, this can be accomplished by turning over each sheet immediately after it has been printed on one side and feeding it through the printer a second time to be printed with the visual image on the next following page.

Complications arise in making multiple copies of sheets with visual images on both sides in numerical page order. If each sheet is printed by first printing one side, turning the sheet over and then printing the other side, the time required to print a large number of copies of a lengthy job is prohibitive. On the other hand, if all copies of one page are made before turning the sheets over and copying the next page onto the other side, it becomes necessary to collate the sheets. If done by hand, collation of a large number of copies takes considerable time; and while mechanical collators are available for certain types of copying machines, they tend to be expensive and can only handle a limited number of copies.

As will be evident, analogous problems exist in duplex printing of multiple copies of visual images on a continuous web of a recording medium instead of discrete sheets. In such case, it is advantageous first to print one side of the web in its entirety, then the other side, to separate the web into individual sheets with a visual image printed on each side, and finally to collate the sheets as required.

For convenience, unless clearly indicated to the contrary, the term "recording medium" is used generically hereinafter to include both discrete sheets and continuous webs of any surface on which printing can be formed in accordance with the invention. Typically, the recording medium is paper. The term "page" is used to refer to one side of a sheet and the record formed thereon is referred to as an image. Ordinarily, in the practice of our invention, this image will be a visual image, that is, one discernible by the human eye; but our invention may be practiced using printed images that are not visible. The term "printing"is used in its broadest sense to mean the formation of images of any type whatsoever including, without limitation, pictures, charts, symbols, alpha-numeric text and the like.

SUMMARY OF THE INVENTION

We have discovered a method and apparatus for collating multiple copies of sheets printed with images on one or both sides from electrical signals received at a printer. For printing multiple sets on one side only, the signals are written into a memory in the order in which they are received. The first set may be printed in numerical page order on a recording medium fed through the printer as the signals are received. Additional sets are printed in the same page order by writing the contents of the memory into the printer as many times as necessary as the recording medium is fed through the printer.

For printing multiple sets of pages on both sides, the signals representative of every other page are written into the memory and organized into two ordered sequences. One of these sequences contains the electrical signals representative of each of the pages to be printed on one side of the recording medium and the other sequence contains the electrical signals to be printed on the other side of the recording medium. Within each sequence the order of the signals is such that the signals representative of adjacent pages in the order to be printed are adjacent one another in the sequence. Again, the first set may be printed in the desired page order as the signals are received. Each additional set is printed in the desired page order by writing first one sequence and then the other into the printer with one sequence being written in the opposite page order to that in which the signals are received. While the first sequence is being written, the recording medium to be printed is fed through the printer into a last-in-first-out (LIFO) receptacle along a feed path that effectively turns it over. While the second sequence is being written, it is fed from the LIFO sheet receptacle, back through the printer, to an output receptacle.

DETAILED DESCRIPTION OF THE DRAWINGS

These and other objects, features and elements of our invention will be apparent from the following detailed description of the drawing in which:

FIG. 2 is an example of the visual image printed on a page by the printer of FIG. 1;

FIG. 3 is a schematic illustration of the sheet feed path in the printer of FIG. 1;

Figure 1:
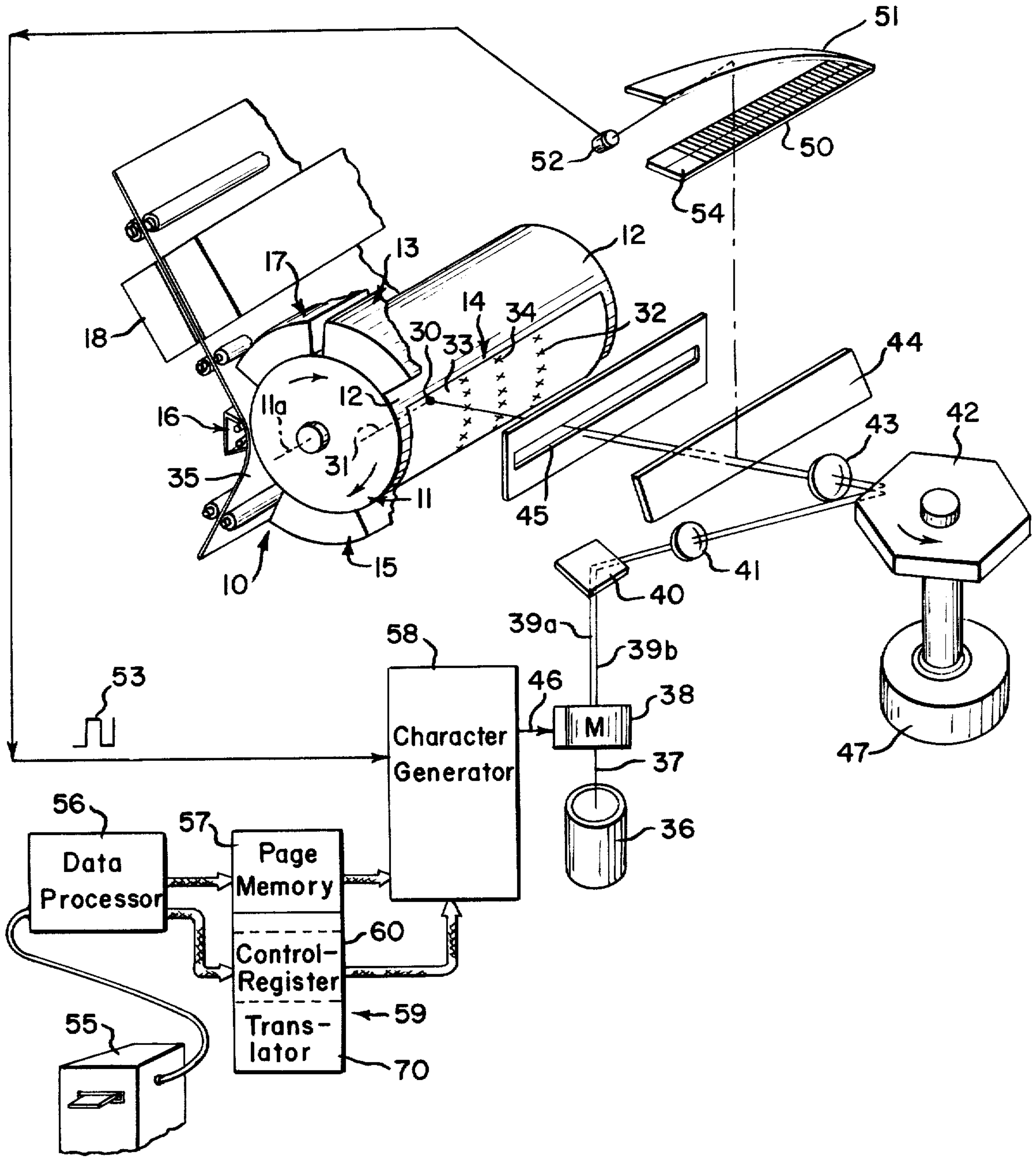
FIG. 1 (Prior Art)
FIG. 1 is a schematic drawing of an illustrative printer used in the practice of our invention.

In FIG. 1 there is shown a prior art xerographic page printer 10 suitable for use with the present invention together with a block diagram showing the primary image generation control components employed in conjunction therewith. Page printer 10 forms on a recording medium 35 a visual image in response to an electrical signal representative of the visual image. Printer 10 includes a xerographic type copy drum 11 providing an image receiving photoconductive surface member 12. Surface 12 is rotated successively past a charging station 13, an exposure station 14, a development station 15, a transfer station 16 and a cleaning station 17. At exposure station 14, a uniform charge applied to surface 12 at charging station 13 is selectively dissipated by a binarily controlled light spot 30 that traverses a path 31 extending parallel to the axis of rotation 11*a* of the drum 11. Selective exposure by the spot 30 generates binary elements of an electrostatic latent image 32 consisting of discharged white or background area 33 and charged image areas 34. Latent image 32 is presented to development station 15 where colored thermoplastic resin powder or toner is selectively deposited on the image areas 34 to develop the latent image. The developed image is transferred by electrostatic force at station 16 to recording medium 35 which may be a sheet or continuous web of a medium such as paper which is fed through the printer along a well-defined path. The thus printed medium 35 is passed through a fixing station 18 where heat or other suitable means temporarily liquifies the resin toner to cause it to adhere to the recording medium and form a permanent image. Medium 35 is then delivered to an exit pocket or tray where it can be removed from the machine. Any toner powder remaining on surface 12 as it leaves transfer station 16 is cleaned at station 17 prior to recharging of surface 12 for further operation.

Since the details of the xerographic printer are well known to those skilled in the art and form no part of this invention, they are not further described herein. It is to be understood that a variety of techniques exist for performing the various functions identified so as to form on medium 35 the visual image of a page in accordance with the signal impressed on controlled light spot 30.

Controlled light spot 30 is preferably generated from a source of high coherent light such as a continuous mode laser 36 that projects a laser beam 37 along an optical path through spot control light modulator 38, redirecting mirror 40, lens 41, scan mirror 42, lens 43, beam splitting partial mirror 44, and modulation knife edge 45 to surface 12. Illustratively, modulator 38 is an acousto-optic Bragg effect device known to those skilled in the art. Modulator 38 responds to binary electrical information on its input line 46 to emit beam 37 in either of two closely adjacent but slightly different output paths 39*a* or 39*b*. If the beam 37 is emitted along output path 39*a*, it will ultimately be directed past modulation knife edge 45 and strike photoconductive surface 12 as spot 30 to discharge the surface and thereby ultimately cause white or background area to be produced on recording medium 35. Light emitted along path 39*b* is intercepted by modulation knife edge 45 and thus does not strike the surface 12. The undischarged area that remains on surface 12 will develop a toned image at station 15 to form part of the image area on recording medium 35. Thus, modulator 38 controls the formation of visual images on medium 35 in accordance with electrical signals applied to the modulator.

Scan mirror 42 receives laser beam 37 along both paths 39*a* and 39*b* and directs it along the scanning path 31 whereby it generates a single raster scan of one column of the visual image being formed on medium 35. Mirror 42 is configured as a regular polygon and is driven by a motor 47 at a substantially constant speed that is chosen with regard to the rotational speed of drum 11 and the size of spot 30 such that individual scanning strokes of spot 30 traverse immediately adjacent areas on the surface 12 to provide a full page exposure raster.

A typical page 20 produced by such scanning is shown in FIG. 2. Each scan of spot 30 along path 31 generates a columnar segment 24 on page 20. As shown in the exploded view, each character 21 on the page is a pattern of dots, each of which dots is formed by momentarily deflecting beam 37 so that it is intercepted by knife edge 45. By way of example, the dot density may be 240 dots per inch in both the vertical and horizontal directions on page 20.

Returning to FIG. 1, beam splitting mirror 44 intercepts a fraction of laser beam 37 along both paths 39*a* and 39*b* as it is moved through its scanning motion by mirror 42 and diverts this fraction through an optical grating 50 to an elliptical mirror 51 by which the light is reflected to a photodetector 52 positioned at one foci of the mirror 51. Scan mirror 42 is located at the other foci of elliptical mirror 51 and the optical geometry of the system is selected such that grating 50 is positioned to be equivalently located relative to exposure station 14. Photodetector 52 thus creates a train of clocking pulses 53 that is a direct measure of the scanning movement of laser beam 37 relative to the photoconductor surface 12. Conveniently, the pulses produced at photodetector 52 occur at the same rate that image elements or dots are to be defined by modulator 38 thereby enabling photo-detector 52 to directly generate a gating clock signal for control of the modulator 38. For example, each half cycle of the pulse waveform 53 shown in FIG 1 corresponds to one black or white dot. A continuous transparent portion 54 of the grating 50 is provided to enable detection of scan completion.

For specific control of modulator 38, there is provided a source of raw text data (text or image indicating signals) such as magnetic card or tape reading device 55 which delivers the data to be printed to data processing apparatus 56 by which the raw text data is assembled in a desired format into a page memory 57. In the page memory 57 each character or symbol to be printed as well as spaces to be inserted between symbols are recorded at individual memory addresses which are, in turn, associated with the writing lines of a normal page and with the order position of the symbol within the writing line. For example, referring to FIG. 2, a code defining symbol "*b*" on page 20 would be stored in page memory 57 at an address that is identified with the eighth writing line (seven blank lines provide a top margin) and the seventeenth order position (the left margin is composed of five blank symbols in this example).

Once the text indicating signals has been assembled in page memory 57, character generation circuitry 58 operates to provide the final dot pattern control to modulator 38. In addition to page memory 57, both data processor 56 and the character generation circuitry 58 have access to memory space in additional memory 59. Memory 59 also includes a page memory access control 60 as well as a font memory reference address and escapement value table in translator 70. For further details on the structure and operation of page memory 57, character generation circuitry 58, memory 59, page memory access control 60 and translator 70, please see U.S. Pat. No. 3,898,627 to R. W. Hooker et al. and copending U.S. application now U.S. Pat. No. 4,000,486 Ser. No. 643,566 filed in the name of R. R. Schomburg and assigned to the assignee of the present application. Both the U.S. Pat. No. 3,898,627 and the Ser. No. 643,566 are hereby incorporated by reference.

Knowledge of the feed path of recording medium 35 is useful in understanding our invention. Since visual images are formed on sheets of paper in the preferred embodiment of our invention, the operation of the feed path will be described with reference to a sheet feeding system. As shown in FIG. 3, blank sheets of paper are stored in a paper supply 80. From there they are drawn along a feed path 82 to synchronizing gate 84. Gate 84 operates to feed the sheets one at a time to transfer station 16 in synchronism with the movement of image 32 on rotating xerographic drum 11. Each sheet printed at station 16 continues along feed path 82 through a fixing (fusing) station 18. When the printer is operating in the simplex mode, each printed sheet is then fed past a diversion gate 86 to an output feed path 88. Feed path 88 guides the printed sheets to an output tray 90 where each simplex-printed sheet is placed printed-side down on top of any previously printed sheet in the tray.

When the printer is operated in the duplex mode, each sheet is drawn from paper supply 80 in the same fashion as in the simplex mode and is printed on one side. Upon exiting the fixing station 18, the simplex-printed sheet is intercepted by diversion gate 86 and directed along a duplex feed path 92 into interim storage unit 94. Storage unit 94 is a last-in first-out (LIFO) receptacle in which each sheet is stored printed-side up. As will be apparent, storage of the sheet with its printed side up has the effect of turning the sheet over. Each sheet transferred to storage untit 94 is then fed back through feed path 82 to xerographic drum 11 to be printed with a visual image on its second side. Each duplex printed sheet is then fed past diversion gate 86 to output feed path 88 and output tray 90.

From the above description one can appreciate the problems which arise in attempting to collate multiple sets of duplex-printed sheets. If each set is printed in numerical page order by printing first one side of the first sheet, feeding it to the interim storage unit, removing it from that unit to print the other side of the sheet, and repeating the process for each subsequent sheet in the first set and so forth for all sets required, it is apparent that the printing of a very large job would be quite lengthy. Alternatively, all the first pages for all sets required could be printed successively, followed by the third page and so on; and all the printed odd pages could be stored in interim storage unit 94. The even pages could then be printed on the reverse sides of the sheets and the sheets could be collated manually or mechanically. Under such circumstances, it would be necessary to use a reversing means 98 shown in output feed path 88 to turn the sheets over before they are collated. Otherwise, while the sheets would be in proper order, they would be backwards with the even side of the page first.

To eliminate the need for manual or mechanical collation, we have devised a method and apparatus that collates the sheets electronically at the time they are printed. As indicated above, prior art electronic printers often include a memory device for storing the electrical signals representative of the visual images on a series of pages. A suitable storage means for use in practicing our invention is a conventional floppy disc storage unit (FDSU), such as IBM Model 33FD Diskette unit.

Figure 4:
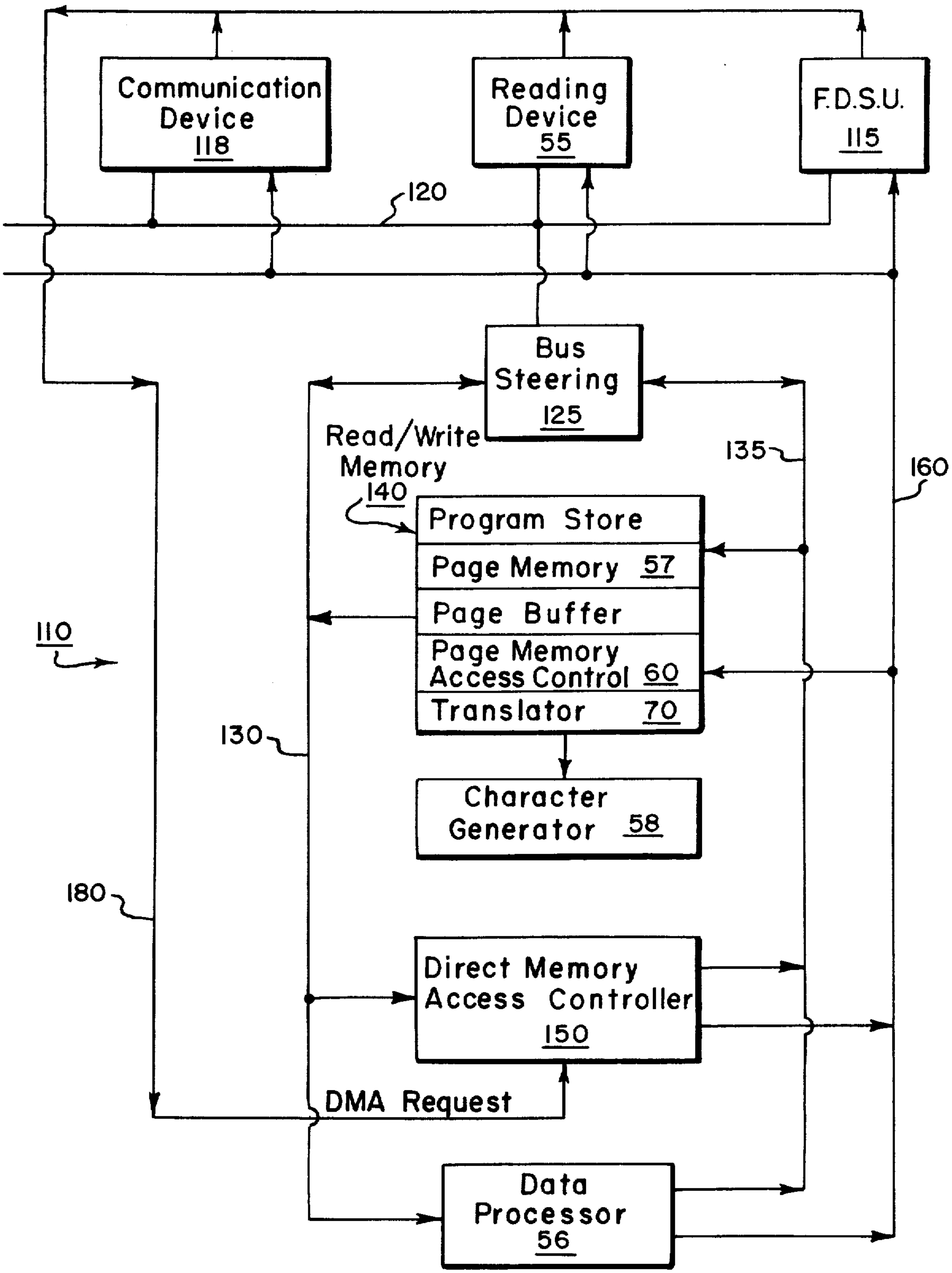
FIG. 4 is a schematic illustration of certain electronic controls in the printer of FIG. 1.

FIG. 4 is a block digram depicting the hardware inter-relationship of such a storage unit with certain of the control components whose function is depicted in FIG. 1. The input/output devices of control apparatus 110 of FIG. 4 include reading device 55 and a floppy disc storage unit (FDSU) 115 which are connected on a common input/output data bus 120 to a bus steering device 125. They may also include a communication device 118 and other apparatus each of which functions in substantially the same fashion with respect to data bus 120. The bus steering device is connected in turn by common data busses 130, 135 to a read/write memory 140, data processor 56 and a direct memory access (DMA) controller 150. Data processor 56 is a central processing unit (CPU). It and DMA controller 150 provide addresses on bus 160 to read/write memory 140 as well as the input/output devices and data on bus 135 to memory 140 and to the input/output devices via bus steering device 125 and data bus 120. Illustratively, the data busses 120, 130 and 135 provide for transmission of 8 bits in parallel and address bus 160 provides for transmission of 16 bits parallel.

Read/write memory 140 includes the program store, page memory 57, a page buffer, page memory access control 60, and translator 70. One output of memory 140 is to character generator 58. For direct access to memory 140, each input/output device is provided with a request line 180 to DMA 150 which enables it to read directly from memory 140 or write directly into memory 140.

The general interaction of the elements of control apparatus 110 is as follows. Data processor 56 receives electrical signals from magnetic card or tape reading device 55 and processes these signals so they can be used in the electronic printer. In particular, processor 56 organizes the image indicating electrical signals so as to associate the characters they represent with particular lines and columns of the image printed on page 20 of FIG. 2. The processor then transfers the electrical signals representative of a page to page memory 57. From page memory 57, the signals are then written, one byte at a time, into FDSU 115 under control of DMA 150. After a page is written into page memory 57, the contents of memory 57 are used to control modulator 38 so as to form the image of a page on recording medium 35.

Figure 5:
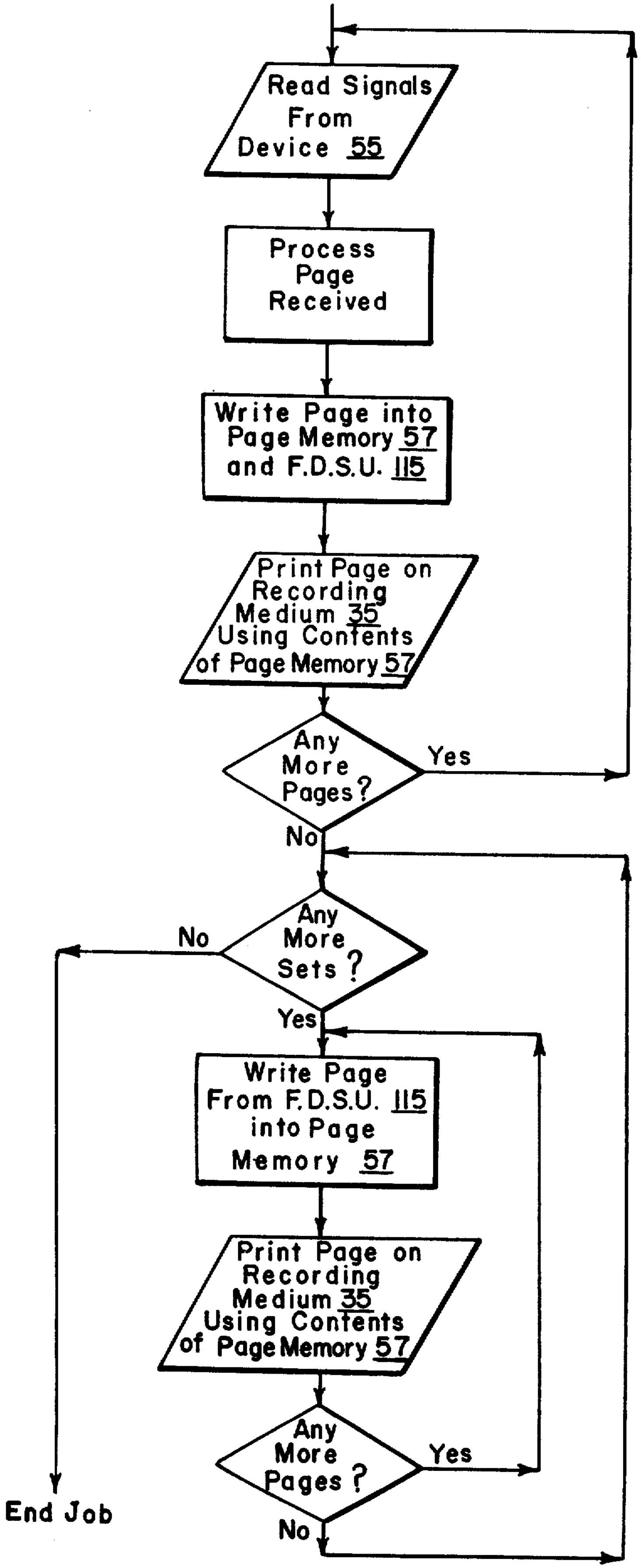
FIG. 5 is a flow chart depicting illustrative operation of the printer of FIG. 1 during simplex printing.

The printing of multiple sets in the simplex mode is summarized in the flow chart of FIG. 5. Each page received is similarly organized by processor 56 and written, one page after the other, into page memory 57 from which it is written into floppy disc storage unit 115; and the electrical signals written into memory 57 are used to control the printing of each page on recording medium 35. After one set of pages has been generated, processor 56 checks to see if any more sets are required. If so, it commences to write each page, one after the other, from floppy disc storage unit 115 to page memory 57 where the signals representative of the page are read and used to control modulator 38 to form an image on recording medium 35. After the second set has been formed by this process, data processor 56 again tests whether any more sets are required. If so, it begins anew the process of writing the contents of floppy disc storage unit 115 into page memory 57. When all the required sets have been made, the processor goes on to the next job or shuts the printer down. As will be evident, each set printed is collated and the order of the pages is that in which they were written into memory 57, which is the same as the order in which they were received at the printer.

When multiple sets are printed in the duplex mode, it may be advantageous to load the electrical signals representative of all the pages in the set into the floppy disc storage unit before any pages are printed. The sequence of such steps will be described first in conjunction with the flow chart of FIG. 6. The alternative of printing the first set as the electrical signals are being written into the storage unit will be described in conjunction with the flow chart of FIG. 7. At present, this alternative is preferred since it takes a longer time to process the electrical signals representative of a page and write them into the storage unit than it does to print the page.

Figure 6:
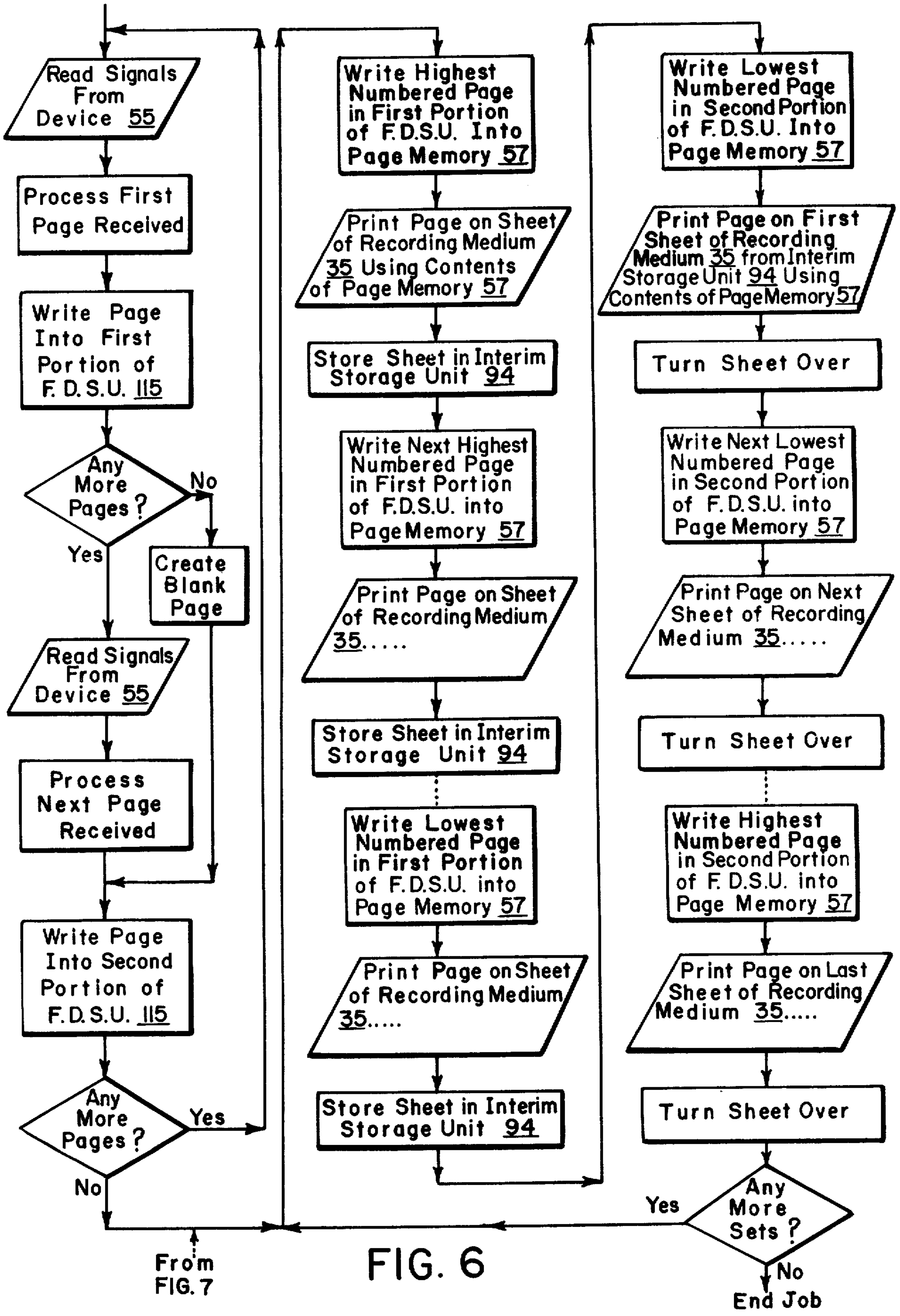
FIGS. 6 and 7 are flow charts depicting illustrative modes of operation of the printer of FIG. 1 during duplex printing in accordance with our invention.

Referring to FIG. 6, the operating sequence begins as the electrical signals representative of the first page are received by processor 56. This page is organized by the processor and written into a first portion of the memory in the floppy disc storage unit. Signals representative of page 2 are then received and organized by the processor. They are then written into a second portion of the memory in the floppy disc storage unit. Signals representative of page 3 are then written into the first portion, signals representative of page 4 into the second portion, and so forth with signals representative of the odd numbered pages being stored in the first portion and signals representative of the even numbered pages being stored in the second portion. The memory is organized so that the signals representative of each odd-numbered page are stored in the first portion of memory in consecutive odd page order, thereby forming a first ordered sequence; and the signals representative of each even-numbered page are stored in the second portion of memory in consecutive even page order, thereby forming a second ordered sequence.

After each page is written into FDSU 115, the processor tests if there are any more pages. If there are no more pages and the last page written was written into the first portion of FDSU 115, then the processor creates a blank page which is written into the second portion of FDSU 115. This blank page is created so that there will always be an even number of pages which simplifies the processing of the sheets through the printer.

When the signals representative of all the pages in the set to be printed have been stored in the floppy disc storage unit, the processor commences the printing operation. Illustratively, it writes each page, one after the other, from the first portion of the floppy disc memory into page memory 57 commencing with the highest numbered page and working down. Thus it writes the first sequence in reverse page order. As the electrical signals representative of each page are written into memory 57, they are used to control the printing of the image of that page on one side of a sheet. Each sheet so printed is intercepted by diversion gate 86 and fed along duplex feed path 92 to interim storage unit 94. After the odd numbered pages have been printed, the processor commences to write the electrical signals representative of each even numbered page from the floppy disc storage unit into page memory 57. It writes these pages by commencing with the lowest numbered page in the second portion of the memory and advancing upwards in numerical order, thus writing the second sequence in normal page order.

Since the interim storage unit 94 is a last-in-first-out receptacle and since the odd numbered pages were printed in reverse order, it is apparent that the sheets in storage unit 94 will be stored in numerical page order with page 1 on top. Thus, when the even numbered pages are read into page memory 57 in ascending order, page 2 will be printed on the reverse side of page 1 and so on throughout the set.

Since the even numbered pages are printed last, they would wind up face down in output bin 90 if these pages followed feed path 88. As a result, the pages would be faced backwards although the sheets would be in proper order. To avoid this, each sheet is diverted by diversion gate 96 from feed path 88 into reversing means 98 where it is turned upside down so that the odd numbered pages face downward in the output tray.

Upon completion of printing of the first set of pages, processor 56 checks to see if any more sets are required. If so, it begins the printing operation anew writing each page from the floppy disc memory. After the second set has been formed, it again tests whether any more sets are required and continues to recycle until all the required sets have been printed. Once the job is done, the processor goes on to the next job or shuts the printer down.

Figure 7:
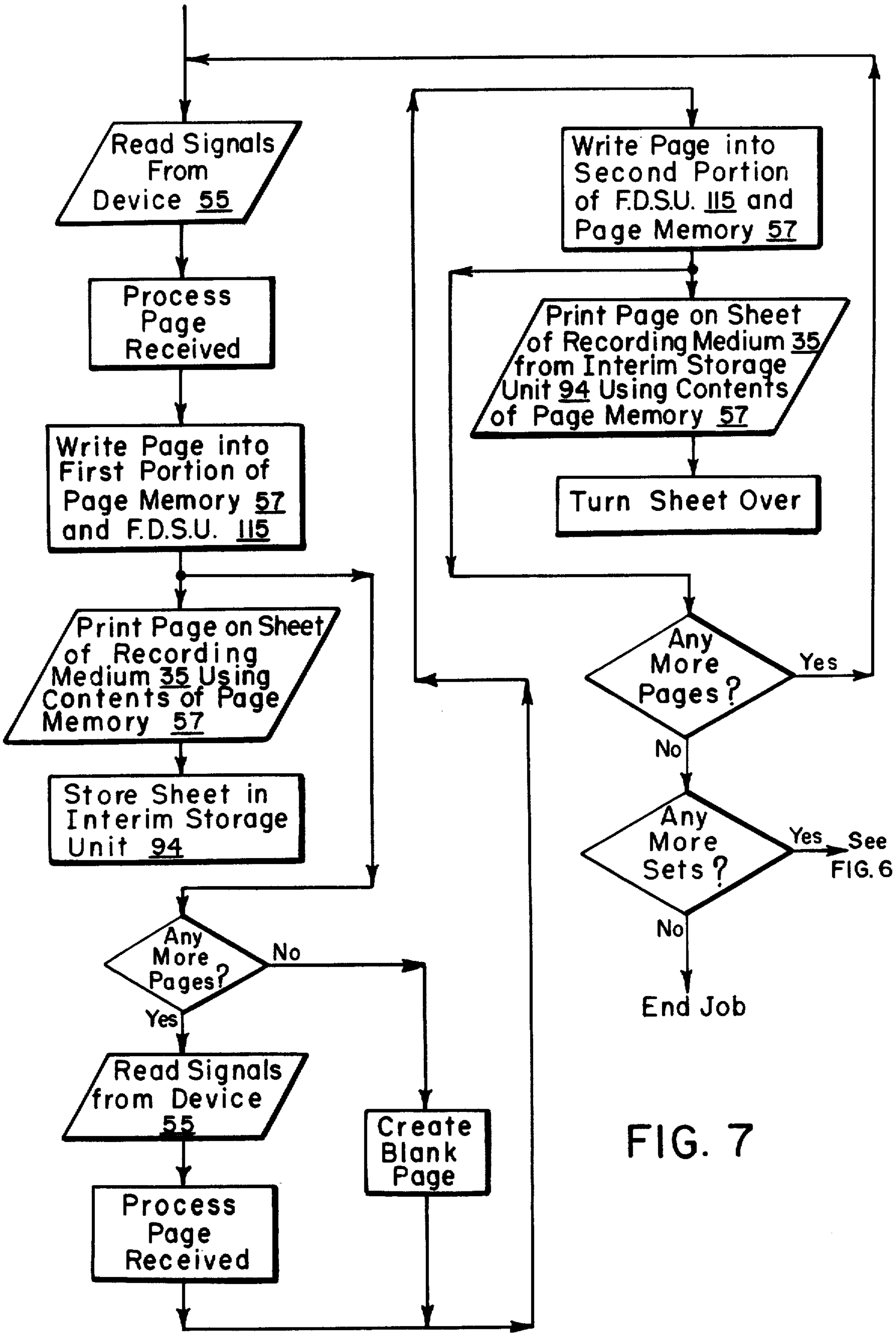

Alternatively, the first set can be printed as the electrical signals are being written into the floppy disc storage unit. Referring to FIG. 7, the operating sequence again begins as the electrical signals representative of the first page are received by processor 56. After the page is organized, it is written into page memory 57. From there it is written into a first portion of the memory in the floppy disc storage unit. The signals representative of the first page are then used to control the writing of the first page on a sheet of recording medium. This sheet is routed by diversion gate 86 along duplex feedpath 92 to interim storage unit 94. As the first page is being printed, signals representative of page 2 are being received and organized by the processor. They are then written into page memory 57 and then into a second portion of the memory in the floppy disc storage unit. Simultaneously, the sheet stored in storage unit 94 is fed along feed path 82 to the xerographic drum where it it is printed with the image of page 2. This sheet then exits along output feed path 88 to output tray 90.

Since output tray 90 stores the most recently printed sheet on the top of the stack, it is necessary to turn the sheet over so that the side bearing the lower page number is stored face down. As indicated above, the sheet is turned over in reversing means 98 before it is placed in output tray 90. As will be apparent, the need to turn the sheet over can be avoided if it is convenient to print the two sides of the sheet in opposite order so that the page bearing the higher number is printed first.

As page 2 is being printed, signals representative of page 3 are received and organized by the processor. These signals are then written into page memory 57 and from there into the first portion of the floppy disc memory and are used to print the third page on the second sheet of recording medium. Page 4 is then organized and written into page memory 57 and from there into the second portion of the floppy disc memory. It is then written on the second side of the second sheet. After each page is written into FDSU 115, the processor tests if there are any more pages. If there are no more pages and the last page written was written into the first portion of FDSU 115, then the processor creates a blank page which is written into the second portion of FDSU 115.

The process continues in this fashion until the first set is completed, at which point the processor checks to see if any more sets are required. If so, it prints the second set using the sequence of steps set forth in conjunction with FIG. 6. Thus, it writes each page one at a time from the first portion of the floppy disc memory into page memory 57 commencing with the highest numbered page and working down. Each simplex page so printed is intercepted by diversion gate 86 and fed to interim storage unit 94. After the odd numbered pages have been printed, the processor commences to write the electrical signals representative of each even numbered page from the floppy disc storage unit into page memory 57. In this case it writes these pages commencing with the lowest numbered page in the second portion of the memory and advancing upwards in numerical order. After the second set is printed, the processor again tests whether any more sets are required. If so, once again it reads the first portion and then the second portion of the floppy disc memory into page memory 56 and continues to recycle until all the required sets have been printed.

Our invention is not limited to the practice of reading the first ordered sequence in descending numerical page order or to reading it first. Nor is it limited to the use of reversing means 98. It is only necessary that the sequence of pages printed on one side of the sheets be read in the opposite page order from the sequence of pages printed on the other side of the sheets. The use of reversing means 98 is only required when the pages printed on the side of the sheet having the lower page number are read in descending numerical page order. Specifically, there are four possible patterns of reading the two ordered sequences as set forth in the following Examples 1–4. If we trace two sheets of paper bearing pages 1–4 through each of these four examples it will be apparent that each example can produce collated sets.

In each of these examples column I indicates the page order of printing the first sequence printed and column III indicates the page order of printing the other sequence. The order in which the pages are printed is reading down through the column. Columns II, IV and V indicate the order and orientation of the two sheets in various storage units. The two horizontal lines in each of these columns for each example represent the two sheets of recording medium that are printed as they lie in the storage unit. Thus, the uppermost sheet in each of these columns in each example is the uppermost sheet in the stack in the storage unit. The space immediately above each line identifies the image printed on the upper side of the sheet as it lies in the storage unit and the space just below the line identifies the image, if any, printed on the lower side of the sheet. Column II indicates the order and orientation of sheets in interim storage unit 94; column IV the order and orientation of sheets in output tray 90 if reversing means 98 is used; and column V the order and orientation in output tray 90 if the reversing means is not used. t,0200

As will be evident, Example 1 illustrates the pattern of reading the floppy disc storage unit that is set forth above in conjunction with FIGS. 6 and 7. For this pattern it is necessary to use reversing means 98 to turn the individual pages in the proper direction. Example 2 illustrates a second pattern which also requires the use of reversing means 98 but stacks the sheets in the opposite direction so that the lowest numbered sheet is uppermost in output tray 90. Examples 3 and 4 illustrate patterns for reading the floppy disc memory unit which avoid the need to use reversing means 98. Of these four reading patterns, we prefer Example 1.

From the foregoing description numerous methods and devices will be apparent to those skilled in the art for implementing our invention. We prefer to use a floppy disc storage unit controlled by a dedicated-purpose computer which simultaneously controls the operation of a xerographic copier/printer. However, the invention may also be practiced using specific hardware components to implement the steps described above.

For the benefit of those not familiar with the art, the following discussion sets forth specific means for implementing our invention. A computer control system will be discussed in conjunction with FIGS. 4, 8 and 9 and Appendix A and a hardware control system will be discussed in conjunction with FIGS. 10–13.

As indicated in FIG. 4, read/write memory 140 includes page memory 57 and page buffer 142. These two memories are physically adjacent one another in memory 140 and replace one another as they are used. Thus, after page memory 57 has been used to write a page into floppy disc storage unit 115 or after it has been used by character generator 58 to print a page, the next page in page buffer 142 becomes page memory 57. Simultaneously, the portion of memory 140 which was just used as page memory 57 is allocated to page buffer 142. As is evident from copending application Ser. No. 643,566, data is stored in the memory so that each successive character in the image of a page is located at the next highest address of the memory. Thus, page memory 57 is written into floppy disc storage unit 115 simply by incrementing a page memory address register through the range of addresses at which the page information is stored.

As is well known, the floppy discs used in storage unit 115 store information in concentric tracks on their surfaces. Illustratively, there may be 70 or more such tracks on a disc each of which is subdivided into sectors which take up a small portion of the arc of the circle defined by the track. The user has the option of defining the information storage capacity of each sector to be $128 \times 2^N$ where $N = 0, 1, 2$. In practicing our invention we prefer that each sector store 256 bytes, in which case there are 15 such sectors on each track.

When a record of information is written onto a floppy disc, a conventional search routine seeks the first empty track on the disc and writing commences in the first sector of the available track. Data is then written into as many successive sectors in the track as needed. If one track is not enough to store the complete record, the storage unit writes the first track, then searches for the next available track and commences writing the remainder of the record in the first sector of the next available track. It will be apparent that this practice minimizes the time required to switch writing from one track to another since the first and last sectors of each track are next to each other. In this fashion, writing continues until the entire record of information is written on as many tracks as are needed on the floppy disc. Following familiar techniques, control information is provided that identifies the end of a complete record of information. In addition, information is recorded that links together the different tracks on which a record is written. This linking information is used by data processor 56 during read out to determine the proper sequence in which the tracks are read. Ordinarily, the linking instructions direct storage unit 115 to read the tracks in the same order in which they were written.

As indicated above, data transfer in our invention takes place in both directions between floppy disc storage unit 115 and read/write memory 140. This data transfer is effected one byte at a time by operation of direct memory access (DMA) controller 150 as will be explained in greater detail below.

When the floppy disc is used for simplex printing, the electrical signals representative of each page are written on the floppy disc, one page after another, on the available tracks under control of DMA 150. Storage unit 115 commences writing with the first sector of the first available track and writes data onto each succeeding sector of the track before moving on to the next available track. In accordance with the practice in the art, special codes are used to denote margins and other spaces on each page so that a typical page takes up considerably less than a full track on the floppy disc. Following conventional practice, the next page is recorded commencing with the next sector of the same track. Since the writing of each page begins with the available sector closest to sector 1, the pages that are written can be described as "pushed forward" in the track.

When the signals recorded on the floppy disc are used to control printing, unit 115 begins reading from the first sector of the first track on which the electrical signals are recorded. It writes this information under control of DMA 150 from the disc into memory 140 to the extent that space is available in memory 140 or to the end of the file. The first page of the information so written is designated page memory 57 and the remainder is page buffer 142. As indicated in U.S. Pat. No. 3,898,627 and copending application Ser. No. 643,566, the contents of page memory 57 are read out to control character generator 58 in printing a page. After each page is read from page memory 57, the next page in the page buffer becomes page memory 57; and the space from which the page has been read is assigned to the page buffer. If data remain to be written into memory 140, this space is then loaded from the floppy disc under control of DMA 150. When unit 115 has read one track completely, it follows the linking instructions directing it to the next track and continues reading at sector 1 of the track. Since unit 115 begins to read each track at sector 1 after reading the last sector of the preceding track, read out time is minimized.

In duplex printing, one of the two ordered sequences is read from floppy disc storage unit 115 and written into memory 140 in the same direction as it is written into storage unit 115. This sequence is written on and read from the floppy disc under control of DMA 150 in the same fashion as the electrical signals are written on and read from the floppy disc in simplex printing. However, with the ordered sequence that is read from the floppy disc in the reverse direction from that in which it is written, it is necessary to reverse the direction of the linking instructions and to write the pages on the floppy disc in a different fashion so that they will be read out as quickly as possible in proper order when the ordered sequence is read in the reverse direction. Techniques for reversing the direction of linking instructions in memories such as floppy disc storage unit 115 are well known to those skilled in the art.

To minimize read out time, the pages should be written on the floppy disc so that the second portion of any page stored on two tracks is located at the front of the second of the two tracks read. For the pages that are read from the floppy disc in the opposite order to that in which they were written thereon, this requires that the pages be written so that they are pushed toward the back of each track whereas the pages which are read from the floppy disc in the same order in which they are written thereon are pushed toward the front of each track.

Figure 8:
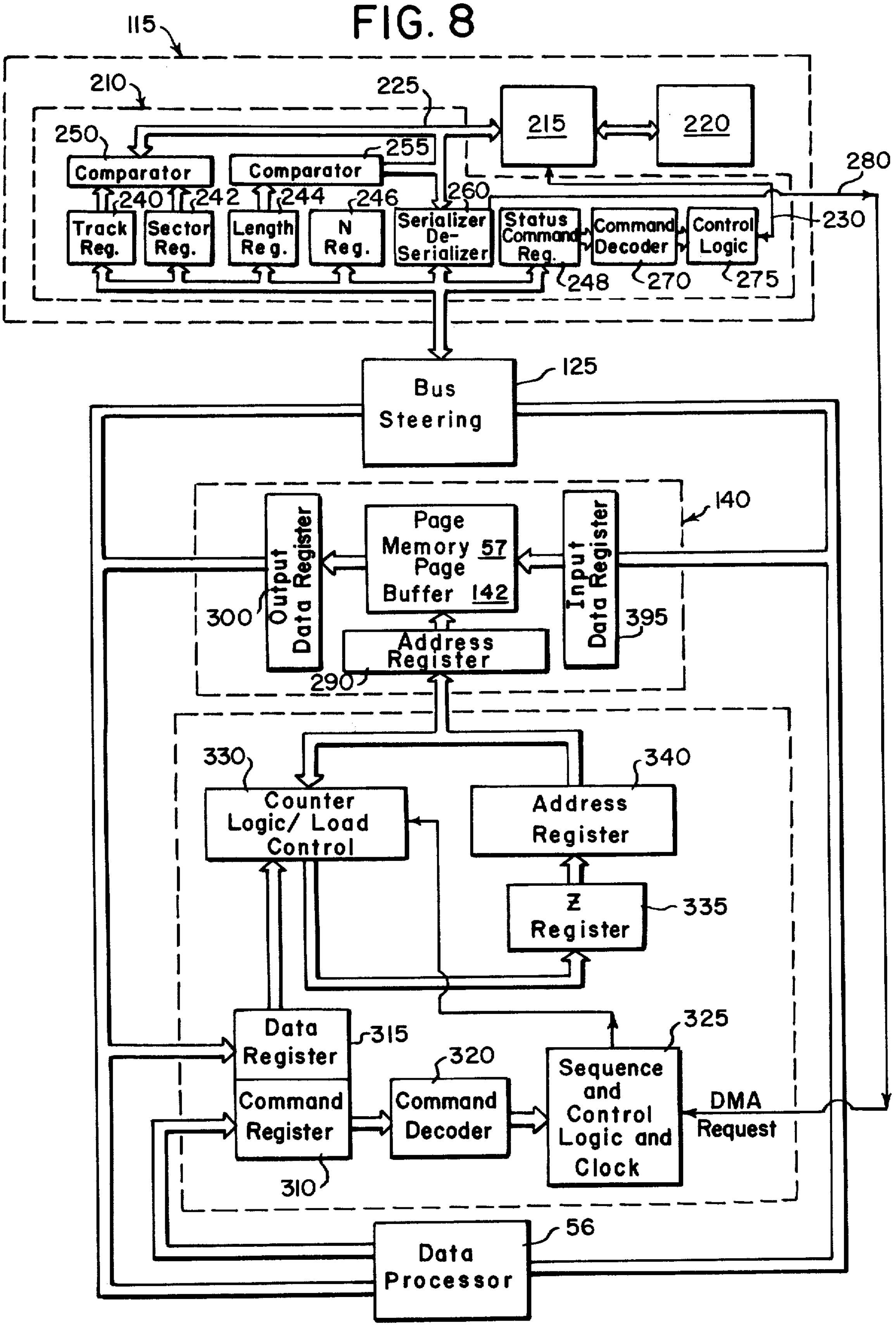
FIG. 8 is a schematic illustration of details of the electronic controls of FIG. 4.

Further details of the floppy disc storage unit 115, read/write memory 140 and DMA controller 150 are set forth in FIG. 8. Storage unit 115 comprises an input/output interface 210, a drive electronics unit 215 and a floppy disc drive unit 220. Units 215 and 220 are commercially available in numerous forms and will not be discussed further. Data input and output to unit 215 is provided by data bus 225. Control lines 230 are also provided between units 210 and 215.

Interface 210 includes the following registers: a track register 240, a sector register 242, a length register 244, an N register 246, and a command/status register 248. The track and sector registers 240, 242 store numbers indicating the track and sector at which a read or write is to begin. The length register 244 indicates the amount of data to be read or written. The N register 246 stores the value of the exponent in the expression $128 \times 2^N$ which specifies the number of bytes in a sector. The command/status register 248 stores commands such as read or write. Interface 210 also comprises comparators 250, 255, a serializer/deserializer 260, a command decoder 270 and control logic 275. Comparator 250 compares the contents of registers 240 and 242 with information from drive unit 215 indicating the track and sector location of a read-write head in floppy disc unit 220 to determine if the read/write head is properly located. Comparator 255 compares the number of bytes specified in length register 244 with the number actually transferred through serializer/deserializer 260 to or from memory 140. Serializer/deserializer 260 converts parallel input data from bus 120 to serial data for recording on the floppy disc and converts serial data from the floppy disc to parallel data for output to the remainder of the system. Command decoder 270 decodes commands stored in command/ status register 248 and control logic 275 operates storage unit 115.

Control unit 210 takes data in one byte units from read/write memory 140 and writes them on a floppy disc or reads data in one byte units from the floppy disc and transfers them to memory. The transfers of data are accomplished directly to and from memory using direct memory access (DMA) controller 150. When control unit 210 is ready to transfer data in either direction, it requests access to memory by DMA request line 280 from serializer/deserializer 260 to DMA controller 150.

Read/write memory 140 comprises page memory 57, page buffer 142, an address register 290, a data input register 295 and a data output register 300.

DMA controller 150 comprises a command register 310, a data register 315, a command decoder 320, sequence and control logic and clock 325, counter logic/load control 330, a Z register 335, and an address register 340. When data is to be transferred to or from memory 140, data processor 56 provides DMA controller 150 the address in memory 140 of the beginning of this data together with the commands needed to load this address in Z register 335. The commands are applied to command register 310 and are decoded in decoder 320. They are then used by sequence control logic 325 to load the address from data register 315 to the Z register via counter logic/load control 330. Processsor 56 also loads into length register 246 the length of the data to be written or read.

When floppy disc storage unit 115 is ready to read or write data, it requests direct memory access via line 280. This request is decoded and when a computer cycle becomes available, the address in Z register 335 is read into address register 340 from which it is applied to address register 290 in memory 140. If, for example, a write operation is taking place from memory 140 to floppy disc storage unit 115, the byte at the address in memory 140 specified by address register 290 is read from memory 140 and written into serializer/ deserializer 260. There it is converted into serial information which is applied to unit 215 to be written onto a floppy disc mounted in drive unit 220. Conversely, if a read operation is taking place, a byte of information stored on the floppy disc is read therefrom in serial fashion, converted to parallel information and written into memory 140 at the address specified by address register 290.

The address in Z register 335 is then incremented by one by counter logic 330 to prepare for the next write or read at the next address in memory 140. In this fashion, information is read from memory 140 and written into storage unit 115 or is read from storage unit 115 and written into memory 140 until the number of data transfers equals the length stored in register 244. This equality is recognized by comparator 255 which terminates the DMA request on line 280. For the next write or read, processor 56 must provide DMA controller 150 with the start address as well as the appropriate commands and reload register 244 with the length of the data to be transferred.

As will be evident to those skilled in the art, numerous designs are available for interface 210 and DMA controller 150. The example set forth in FIG. 8 is only meant to be illustrative of the operating principles of such typical devices.

Figure 9A:
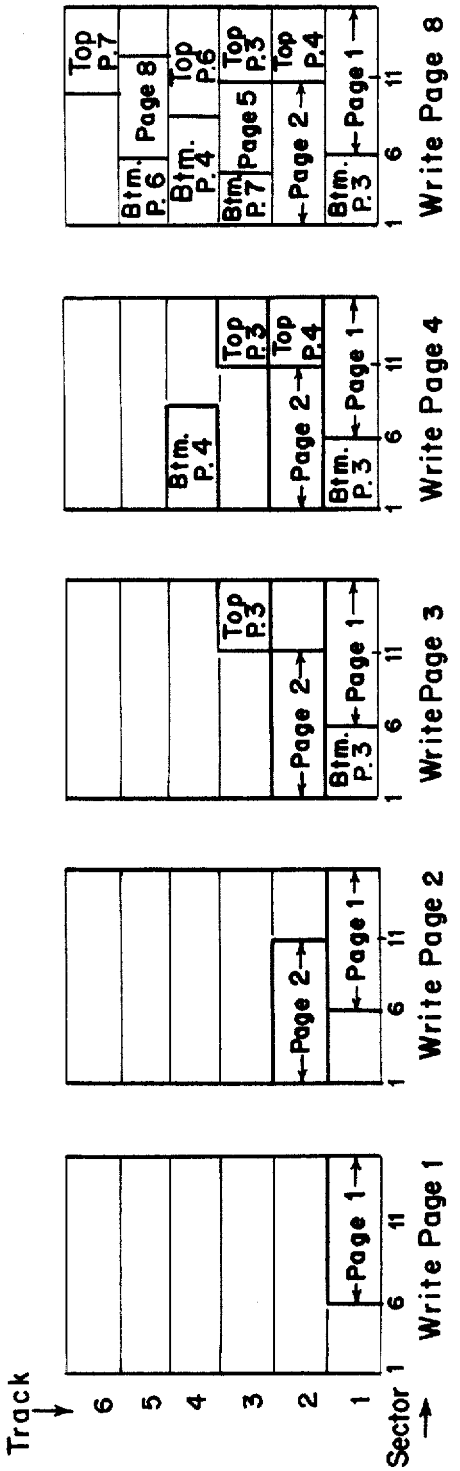
FIGS. 9A and 9B are illustrations of the allocation of memory during duplex printing in accordance with our invention.
Figure 9B:
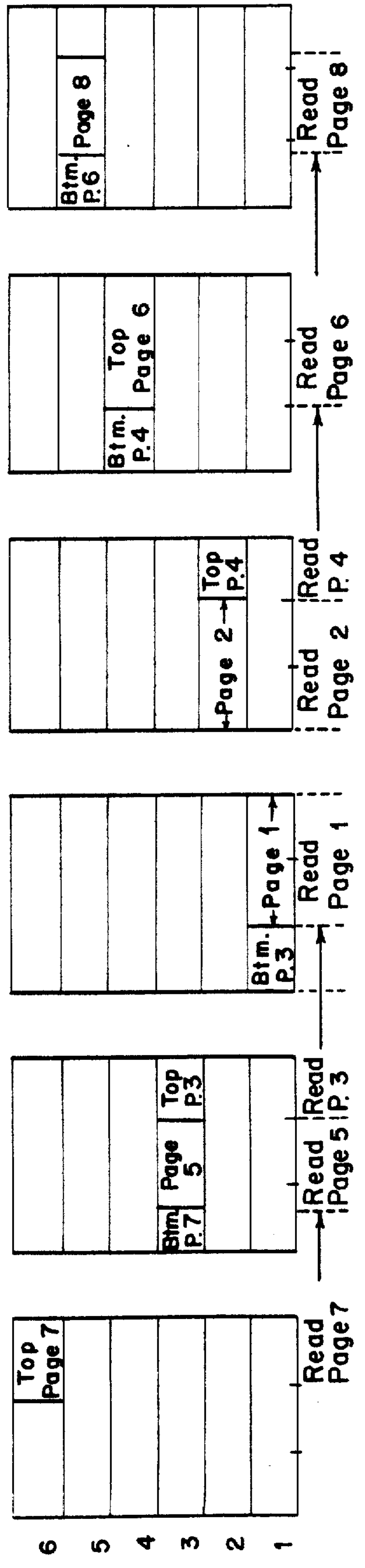

FIGS. 9A - 9B depict the writing and reading of two ordered sequences, the first containing the odd numbered pages and the second the even numbered pages. As in Example 1 and FIGS. 6 and 7, the odd numbered pages will be printed first, reading that sequence from the floppy disc in the reverse direction to that in which it was written thereon. Consequently, the odd numbered pages must be pushed to the back of each track so that they will be read out in proper order. Thus, while the first page is being processed, processor 56 determines how many sectors of the floppy disc will be required to record this page and computes the point at which storage unit 115 should begin recording this page. It then provides DMA controller 150 with the start address of the data in page memory 57 and instructs storage unit 115 and DMA 150 to write this data on the floppy disc. If, for example, the first page requires 10 sectors to be stored on a floppy disc having 15 sectors, it is recorded on that disc on track 1 commencing with sector 6 and running to the end. The next signals received and processed are those representative of page 2. Since these signals are read out in the order in which they are written, processor 56 directs storage unit 115 and DMA controller 150 to store them commencing with the front end of the first track available for the second ordered sequence. Thus, if page 2 is 10 sectors long, it is stored at the front end of track 2 in sectors 1-10.

When page 3 is received, its length is determined. If this is less than the space remaining in the track, the sector is calculated where recording must begin to store the page with the page pushed toward the back of the track, and storage unit 115 is instructed to find this sector on the track. If the length is greater than the space remaining in the track, the processor direct storage unit 115 to store the bottom portion of the page in the unfilled track and calculates the sector where recording must begin in the next available track to store the top portion of the page with the page pushed toward the back of the track. The storage unit is then instructed to find this sector on the next available track. Thus, if page 3 is 10 sectors long, processor 56 determines that the page will not fit in the space available in track 1. It calculates that 5 sectors are available in track 1 and directs storage unit 115 to store the bottom portion of page 3 in these sectors. It then calculates that recording must begin at sector 11 of the next available track to store the top portion of page 3. Finally, it determines that track 2 is unavailable since data is already stored there and directs storage unit 115 to begin writing at sector 11 of track 3. Page 4 is stored in normal order commencing with sector 11 of track 2. Illustratively, page 4 is 12 sectors long with the result that it is stored on the end of track 2 and in the first 7 sectors of track 4.

In like fashion, the remaining pages are stored in two ordered sequences with the pages that are to be read out in reverse page order being pushed to the back of the track and those to be read out in the same order in which written being pushed to the front of the track.

To print from the data stored on a floppy disc, storage unit 115 begins reading the highest numbered odd page. Under control of DMA 150 this data is written into memory 140 until the space available in memory 140 is full. Typically, enough space is available to accommodate three or more pages. The first such page is designated page memory 57 and the remaining data constitute the page buffer. As in the case of simplex printing, the contents of page memory 57 are used to control character generator 58 in printing a page. As each page is printed, the next page in the page buffer is designated page memory 57 and the space previously used for page memory 57 is assigned to the page buffer. This space is then filled by any data remaining on the floppy disc. Thus, in the example of FIG. 9B, storage unit 115 begins reading page 7, which is the highest numbered odd page, commencing with the beginning of this page on track 6, continuing through to the end of this page on track 3 and continuing, in like fashion, through pages 5, 3 and 1 on tracks 3 and 1.

When the page buffer is ready to receive the first of the even numbered pages, storage unit 115 commences reading page 2 beginning with sector 1 on track 2 and the signals representative of page 2 are written into the page buffer under the control of DMA 150. In this fashion, pages 4, 6 and 8 are consecutively read from storage unit 115 and written into the page buffer where they are used to control the printing of these pages on sheets of recording medium.

Portions of a typical program for use with a read/-write memory 140, a DMA controller 150 and a floppy disc storage unit 115 of the type illustrated in FIG. 8 are set forth in Appendix A (not printed, but can be seen in patent application file). In the interest of brevity, this program has been edited to eliminate a substantial number of error routines as well as considerable information of little interest to the understanding of our invention. The instruction set used in this program is that set forth in a commonly - assigned copending application of D. Finlay, Ser. No. 729,451, filed Oct. 4, 1976. This application, which is filed concurrently herewith, is hereby incorporated by reference. As will be evident from examination of this program it provides for the writing of each page of data onto a floppy disc storage unit. For printing on one side of a page only, all pages are written onto the disc as part of a "NORMAL WRITE" procedure. For duplex printing, the even pages are also written onto the floppy disc as part of the "NORMAL WRITE" procedure since they are read from the floppy disc in the order in which they are written. The odd pages which are read from the floppy disc in the opposite direction, are written onto the floppy disc by the "SPECIAL WRITE" procedure.

The CONTCHEK routine checks for conditions prior to writing. In conventional portions of this routine not set forth in Appendix A it updates the sector register, loads the write command and tests for completion of the task. In the NORMAL WRITE subroutine, it initializes the start and active sectors for this write. For duplex writing of the odd pages, as shown in Appendix A, it calculates the number of sectors to be written and calls the SPECIAL WRITE subroutine which generates a map of the available sectors.

The ISTART program performs considerable additional initialization. For a NORMAL WRITE on an empty track, the start and active sectors are set equal to one and the stop sector is set equal to 15. For writing of odd pages in duplex printing, the SPECIAL WRITE SETUP (SWSETUP) subroutine sets the start and active sectors equal to one and the stop sector equal to one less than the sector in which data was last written.

The READ routine is essentially a standard routine since both the first and second ordered sequences are written into the floppy disc storage unit so that each track is read from the first sector to the last. The only difference is that the tracks which store the odd pages are read in the reverse page order to that in which they were written. The reversing of the linkage is accomplished by the WRAPUP and REWINDIT subroutines.

The WRITE routine is also a standard routine except for the fact that the odd pages in duplex printing are stored so that they are pushed to the back of the track. This is accomplished by the initialization procedure set forth in the ISTART program and the SWSETUP and WRAPUP subroutines. Of particular interest, WRAPUP sets the current and last sectors numbers in the track sector pointer table (TSPT) equal to the first used sector on the current track. For normal writing these numbers are set equal to the last used sector.

Finally the REWINDIT subroutine reverses the track pointers in the file in which odd pages are stored for duplex printing.

From the discussion of the instruction set for this program set forth in the copending application of D. R. Andrews and R. Kuseski, the foregoing summary of the program, and the program steps set forth in Appendix A, those skilled in the art will have no difficulty implementing our invention so as to write the contents of one of the two ordered sequences stored in a memory such as a floppy disc storage unit in such fashion that it can easily be read in the reverse page order.

Figure 10:
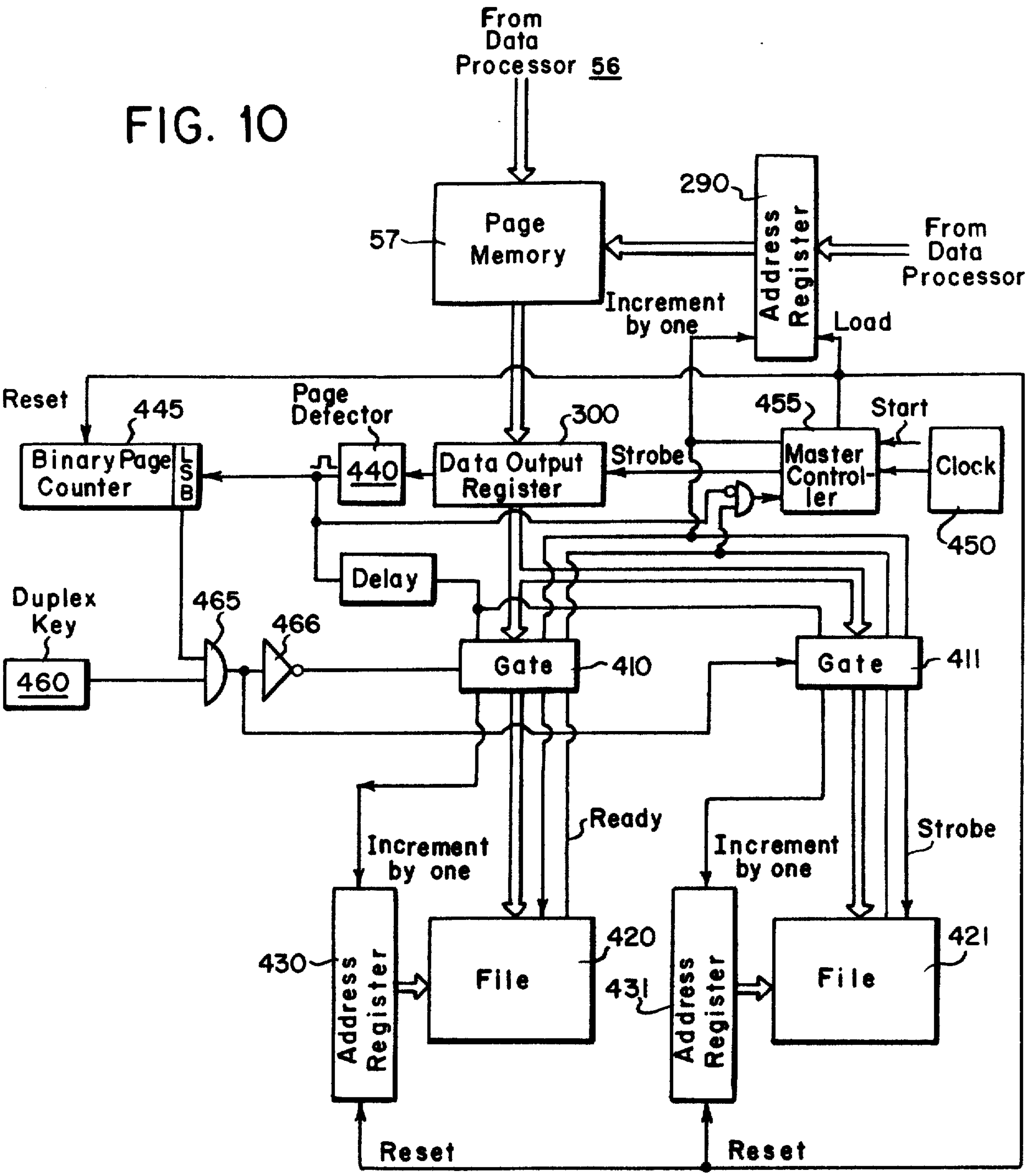
FIGS. 10 and 11 are schematic illustrations of a first illustrative embodiment of apparatus for practicing our invention.
Figure 11:
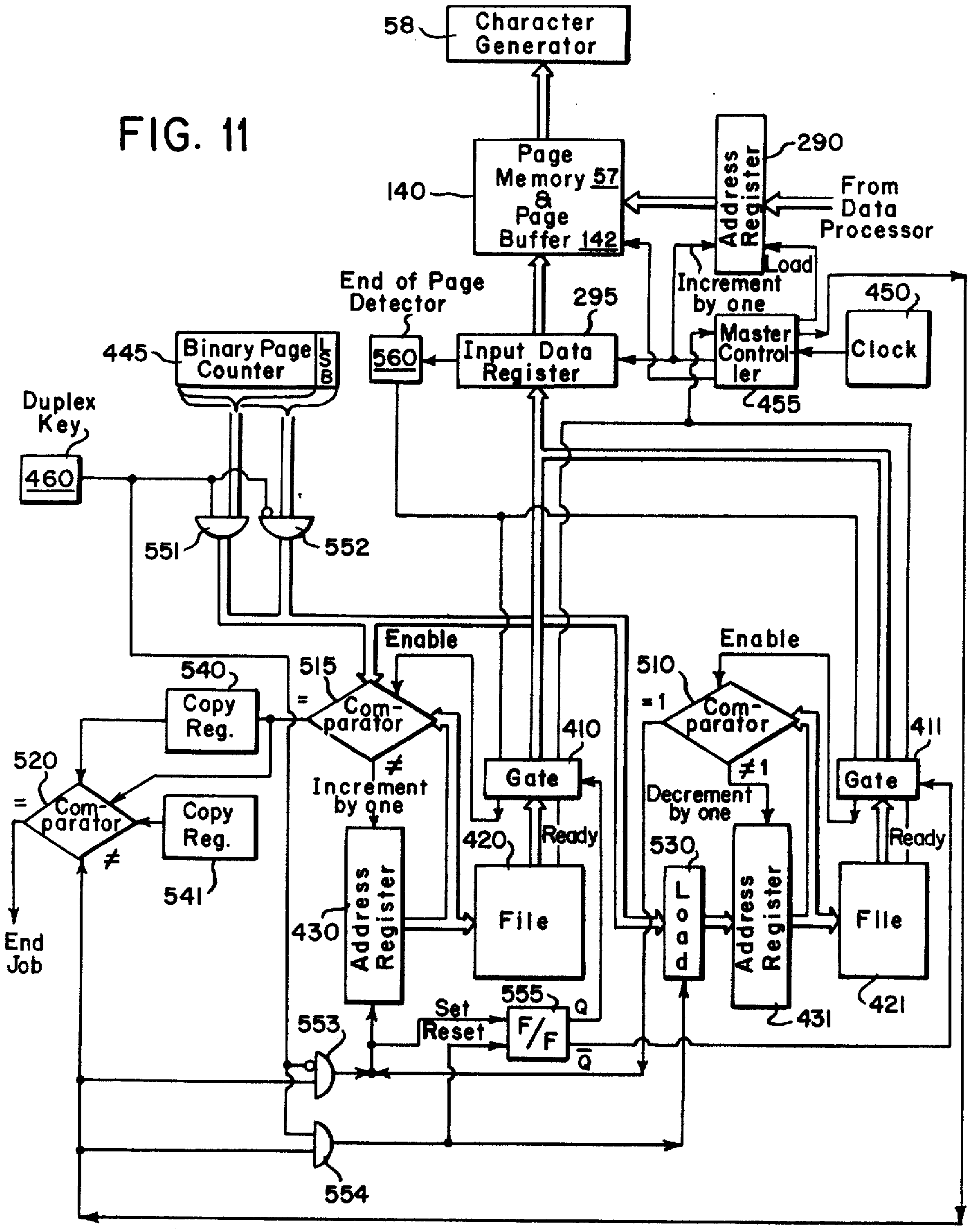

Specific hardware embodiments of our invention are set forth in FIGS. 10-13. FIGS. 10 and 11 disclose a first illustrative apparatus for writing and reading the data signals representative of the the odd and even pages into two separate files. Alternative apparatus which makes more effective use of available memory is set forth in FIGS. 12 and 13.

The apparatus of FIG. 10 comprises gates 410, 411, files 420, 421 and address registers 430, 431. File 420 is used to store the even pages during duplex printing and all the pages during simplex printing. File 421 is used to store the odd pages during duplex printing. Each file is organized so that one address is large enough to store the data signals required to print the image of an entire page; and the addresses in the file are consecutive integers. Thus, the pages can be written into the file or read therefrom, one at a time, in page order or reverse page order, simply by incrementing or decrementing the address register through the range of addresses at which the pages are stored. Data is transferred to and from files 420, 421 one byte at a time, using conventional apparatus which is part of the file to write data into the file and read data therefrom. Appropriate equipment for use as files 420, 421 is any one of numerous conventional magnetic tape storage units. The apparatus also comprises a page detector 440, a binary page counter 445, a clock 450, a master controller 455, a duplex key 460, and logic devices 465, 466. This apparatus is connected as shown to data output register 300 in memory 140.

Illustrative operation of this apparatus is as follows. To write data into file 420 for simplex printing, the operator loads reading device 55 of FIGS. 1 and 4 with a tape or cards bearing the data representing the images to be printed. The operater engages a start key (not shown) which causes the data processor to begin the process of assembling the data into the desired format and loading it into page memory 57. Illustratively the data is processed in units of 256 bytes. As part of this processing, unique codes are inserted at the beginning and end of each page of data identifying those points. Since the data is to be printed on one side of the page only, the operator does not engage duplex key 460. As a result, AND gate 465 is disabled, thereby enabling gate 410 by operation of inverter 466 and disabling gate 411.

When memory 57 has been loaded with a page of data, processor 56 applies a start signal to master controller 455. Thereupon, controller 455 resets counter 445 and registers 430, 431 to "0" and strobes address register 290 to enter into the register the address in memory 57 at which the first byte of data is located. This address is supplied by the data processor. Next, controller 455 strobes output data register 300, which operates as a buffer, to load into it the data at the address in memory identified by register 290.

The entry of these data into register 300 is recognized by page detector 440 as constituting a new page and a pulse from detector 440 increments binary page counter 445 by one and briefly disables a ready signal from the files to controller 455. After a delay, the pulse from page detector 440 is also applied to gate 410. Since this gate is enabled by inverter 466, this increments by one the address stored in address register 430. Illustratively, address register 430 then points to address "1" in file 420. By the time register 430 is being incremented, the disabling signal from detector 440 has terminated; but file 420 is then signaling controller 455 that it is not ready for transfer of data. When the file is ready and such a signal is received by the controller, it strobes file 420 to write the data from register 300 into the file. Typically this data is written into some form of buffer from which it is then transferred to a permanent storage medium such as magnetic tape. At the time it writes the data into file 420, controller 455 also increments memory address register 290 by one so that it points to the address in memory where the next byte of data is stored. It then strobes data output register 300 to write this byte of data into register 300 and monitors file 420 for a signal that the file is ready for data transfer. When the file is ready, controller writes the data in register 300 into file 420 and increments the address in memory register 290 by one. In this fashion, each page is transferred, byte by byte, from memory 57 to file 420. As a new page begins, this is detected by page detector 440 and the address in register 430 is incremented by one to point to the next location in file 420 at which the next page is stored.

To write into files 420 and 421 for duplex printing, duplex key 460 is activated. Since this enables AND gate 465, the enabling of gates 410 and 411 is controlled by the signal applied to AND gate 465 from binary page counter 445. That signal is the least significant bit in the page counter. Thus, when the signal is zero, as it is when the page is even, gate 410 is enabled; and when the signal is one, as it is when the page is odd, gate 411 is enabled.

The writing of pages into files 420 and 421 proceeds as in the writing of pages in simplex printing with the exception that the odd pages are written in file 421 and the even pages in file 420 under control of the least significant bit in binary page counter 445. As will be apparent, signals to increment the address registers 430 and 431 are selectively applied to these registers depending on which of gates 410 and 411 is then enabled.

As indicated in FIGS. 6 and 7, if the last page of data signals received is an odd page, it is preferable to generate a blank even page. With the apparatus shown in FIG. 10 it is assumed that this is done in the processor using conventional techniques so that the final count in binary page counter 445 after all pages have been stored will always be an even number. As will be appreciated by those familiar with binary arithmetic, if the value in page counter 445 is shifted one bit to the right, the shifted value will be one half that of the original value. Since each of files 420, 421 stores one half the total number of pages stored, the shifted value equals the number of pages stored in either of files 420, 421. The count in page counter 445 is retained for use during readout of files 420, 421.

The readout apparatus of FIG. 11 includes gates 410, 411, files 420, 421, address registers 430, 431, binary page counter 445, clock 450, master controller 455 and duplex key 460. Data read from the files are written into input data register 295 from which they are written into page memory 57 and page buffer 142 of memory 140 under control of address register 290. The data in page memory 57 is used to control character generator 58 in printing images on the recording medium following the teaching of U.S. Pat. No. 3,898,627 and application Ser. No. 643,566. The readout apparatus further comprises comparators 510, 515 and 520; a control device 530 for loading address register 431; registers 540, 541 for counting the number of copies made and for storing the number of copies requested, respectively; logic devices 551, 552, 553, 554 and 555; and an end of page detector 560.

For reading data from file 420 for simplex printing, the duplex key is not engaged. As a result, AND gates 551 and 554 are disabled and AND gates 552 and 553 are enabled. Reading starts on a command from the processor to controller 455. The controller resets address register 430 to the first address at which a byte of data is stored and waits until it receives a signal from file 420 that it is ready to transfer data. The signal that resets address register 430 also sets flip-flop 555, thereby enabling gate 410 and disabling gate 411. Since the ready signals are routed through gates 410, 411, a ready signal can only be received from file 420. When it receives the ready signal, controller 455 strobes input data register 295 to write the first byte of data into register 295 and then strobes address register 290 to load the initial address at which the data from file 420 are to be stored. This address is supplied by the data processor. Controller 455 then strobes memory 140 to load the byte of data in register 295 into the memory at the address specified by register 290.

The controller then monitors file 420 to determine if it is ready to transfer another byte of data. When it is, it strobes input data register 295 to write the next byte of data into that register and increments memory address register 290 by one to point to the next address in memory. Controller 455 then strobes memory 140 to write this byte of data into that address in memory. In this fashion, a page of data stored in file 420 is read out byte by byte. When the end of the page is reached, this is detected by end of page detector 560 which enables comparator 515 for a brief interval to compare the address then in register 430 with the total number of pages stored in binary page counter 445. Comparator 515 may be enabled, for example, simply by enabling gates in its output lines. If the addresses are not equal, comparator 515 increments address register 430 and the readout apparatus reads the next page. Thus the pages stored in file 420 are read out and written into memory in the same order in which they were received by the writing apparatus of FIG. 10 during the writing of the pages into file 420. Eventually, the address in register 430 will be incremented enough to equal the page count in counter 445. At this point, comparator 515 increments register 540 by one, signifying the completion of one set of pages to be printed. Comparator 515 also activates comparator 520 for a brief period of time to compare the count in register 540 with the number of copies requested which is stored in register 541. If this number is equal, the job is ended. If it is not equal, comparator 520 applies a signal via AND gate 553 to register 430 to reset it to its initial address and begin reading file 420 anew. This signal is also applied to the set input of flip-flop 555, which does not change its output and therefore continues to enable gate 410. When reset is complete, comparator 520 is disabled.

To read data from files 420 and 421 for duplex printing, duplex key 460 is activated. This enables AND gates 551 and 554 and disables AND gates 552 and 553. Reading starts on a command from the data processor to controller 455. The controller operates control device 530 to load into address register 431 the page count stored in all but the least significant bit of binary page counter 445. This effectively shifts the count in counter 445 one bit to the right to produce the number equal to the highest address of any data stored in file 421. Thus, duplex reading begins with the highest numbered page in file 421. The signal to control device 530 is also applied to the reset input of flip-flop 555 thereby disabling gate 410 and enabling gate 411.

Controller 455 then waits unitl it receives a signal from file 421 that it is ready to transfer data. When it receives the ready signal, the controller strobes input data register 295 to write the first byte of data into register 295. It then loads in memory address register 290 the initial address at which the data from file 421 are to be stored. Controller 455 then strobes memory 140 to load the byte of data in input register 295 into the memory at the address specified in address 290.

The transfer of data continues as in simplex printing, byte by byte, until the page of data is read out. When the end of the page is reached, this is detected by page detector 560 which enables comparator 510 for a brief interval to read the address then in register 431 into the comparator. If this address is not equal to the lowest address at which data is stored in file 421, which illustratively is "1", comparator 510 decrements the address register by one and the readout apparatus reads the next lower page in file 421. Thus, the pages stored in file 421 are read out in the page order opposite that in which they were received by the writing apparatus of FIG. 10 during the writing of pages into file 421. Since the pages that are read are written directly into memory, the page order in which they are written into memory is likewise opposite that in which they were received during the writing of file 421. When the address in register 431 is "1", comparator 510 produces a signal which resets address register 430 to the initial address in file 420 and commences reading of that file into output register 295. This signal is also applied to the set input of flip-flop 555, thereby enabling gate 410 and disabling gate 411.

The reading of file 420 is the same as that in simplex printing with the exception that the comparisons made with the page count at the completion of a page are made with the number stored in all but the least significant bit of binary page counter 445. As indicated above, this number is one-half the total page count in files 420 and 421 and, therefore, is equal to the total page count in file 420. Thus, the pages, stored in file 420 are read out and written into memory in the same order in which they were received by the writing apparatus of FIG. 10 during the writing of the pages into file 420.

When the entire file has been read into register 295, the output of comparator 515 increments copy register 540 and enables comparator 520 to compare the number of copies made with the number of copies requested as recorded in register 541. If this number is equal, the job is ended. If it is not, a signal is routed via AND gate 554 to load control 530 to enter into register 431 the contents of all but the least significant bit of page counter 445. This signal is also applied to the reset input of flip-flop 555, thereby enabling gate 411 and disabling gate 410. As a result, the printing operation begins anew reading file 421 in a page direction opposite that in which the file was written.

As will be apparent, the apparatus set forth in FIGS. 10 and 11 requires the allocation of enough memory at each address to accommodate an entire page. Since the length of data on each page can vary widely, this does not provide efficient allocation of memory. More efficient apparatus is set forth in FIGS. 12 and 13. This apparatus provides for the storage of data of variable length and further provides for the readout of the odd numbered pages in a page order opposite that in which they were written into the file.

Figure 12:
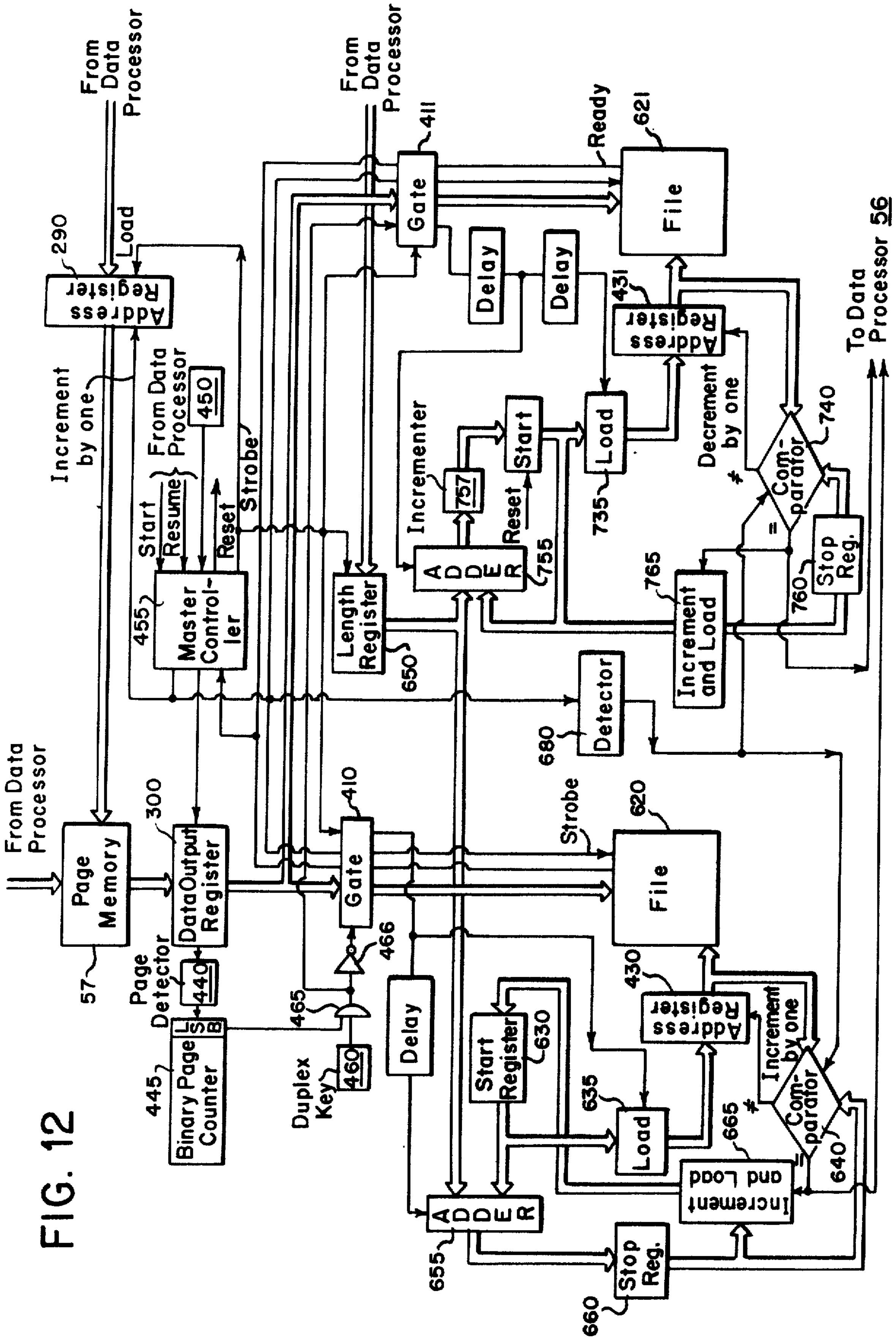
FIGS. 12 and 13 are schematic illustrations of a second illustrative embodiment of apparatus for practicing our invention.

The apparatus of FIG. 12 comprises gates 410, 411, files 620, 621, address registers 430, 431, page detector 440, binary page counter 445, clock 450, master controller 455, duplex key 460, logic devices 465, 466, length register 650, and detector 680. Gates 410, 411, address registers 430, 431, page detector 440, page counter 445, clock 450, master controller 455, duplex key 460 and logic devices 465, 466 are similar in function to those used in FIG. 10 and have been assigned the same numbers. However, page detector 440 of FIG. 12 is set to detect the code identifying the end of a page and controller 455 has an additional input signal. Files 620, 621 are similar to files 420, 421 but are organized so that each address stores a fixed unit of data which ordinarily is considerably smaller than that in a full page. For example, each address may accommodate 256 bytes as in the case of a floppy disc storage unit. The addresses in files 620 and 621 are consecutive integers, permitting these units of data to be written into the file or read therefrom, one at a time, in order or reverse order, simply by incrementing or decrementing the address register through the range of addresses at which the pages are stored. File 620 is used to store the even pages during duplex printing and all the pages during simplex printing. File 621 is used to store the odd pages during duplex printing. Length register 650 stores a number indicating the length of the data to be transferred from memory. Preferably, the data length is the length of the page; and for the apparatus described herein the number stored in register 650 is one less than the number of such units of data to be transferred. Detector 680 senses when all the bytes in one unit of data have been transferred and produces an output signal indicating this. The apparatus for controlling the address in register 430 comprises a start register 630, a load control device 635, a comparator 640, an adder 655, a stop register 660 and an increment and load control device 665.

The operation of master control 455 is similar to that in FIG. 10. When memory 57 has been loaded with a page of data, processor 56 applies a start signal to master controller 455. Thereupon, controller 455 resets registers 60 and 730 to "0" and counter 455 and registers 630 and 760 to "1". For simplex printing, duplex key 460 is not engaged. Hence gate 410 is enabled by inverter 466 and gate 411 is disabled. Controller 455 also strobes address register 290 to enter into the register the address in memory 57 at which the first byte of data is located and strobes length register 650 to load it with a number indicating the length of the data to be transferred from memory. The memory address and the data length are supplied by the data processor. Since gate 410 is enabled, the strobe also loads the address in start register 630 into address register 430 to direct data in output register 300 into the first address in file 620. After a delay, this pulse also commands adder 655 to add the contents of registers 630 and 650 and load them into stop register 660.

Next, controller 455 strobes output data register 300 to load into it the data at the first address in the memory identified by register 290. When file 620 is ready and such a signal is received by the controller, it strobes file 620 to write the data from register 300 into the file. At the time it writes the data into file 620, controller 455 also increments memory address register 290 by one so that it points to the address in memory where the next byte of data is stored. It then strobes data output register 300 to write this byte of data into register 300 and monitors file 620 for a signal that the file is ready for data transfer. When the file is ready, controller writes the data in register 300 into file 620 and increments the address in memory register 290 by one. In this fashion, each byte in the unit of data to be stored at the first address in file 620 is transferred, one byte after the other, into the file. When the complete unit has been transferred, this is detected by detector 680 which produces an output signal that enables comparator 640 for a brief period of time. Detector 680 can simply be a divider stage which divides the counts from readout detector 450 by the number of bytes in each unit of data that is stored in one address in file 620. Thus, for the case where each unit is 256 bytes long, detector 680 can simply be a divide-by-256 divider. Comparator 640 compares the address in register 430 with that in stop register 660. If the addresses are not equal, address register 430 is incremented by one. The bytes in the next unit of data are then transferred, one byte after another, in the same fashion as the first unit but into the second address in file 620. Data transfer continues in this fashion until the amount of data specified by length register 650 has been transferred to file 620. At that point, comparator 640 will determine that the address in register 430 equals that in stop register 660. It thereupon adds one to the address in stop register 660 and loads it via load control device 665 into start register 630. At the same time, it advises the data processor that it is ready to store additional data.

If the amount of data specified in length register 650 is the contents of a page, this will also be the point at which the end of the page code is detected by detector 440. Upon such detection, counter 445 is advanced by one. However, gate 410 remains enabled since the duplex key is not engaged.

If more data are available, the data processor applies a resume signal to master controller 455. This produces a signal on the strobe line but not on the reset line. As a result, the registers 445, 630, 660, 730 and 760 are not reset. However, the initial address of the data is loaded into address register 290 and its length is loaded into length register 650. The new address in start register 630 is also loaded into address register 430 and it is also added to the number stored in length register 650 to form a new stop address which is loaded into register 660. Register 300 is then strobed to write into it the byte of data at the address specified by register 290; and the process of loading data into file 620 resumes, now using the old stop address plus one as the new start address. This operation continues until all the data to be used for simplex printing has been read from memory 57 and written into file 620.

The apparatus for controlling the address in register 431 comprises a start register 730, a load control device 735, a comparator 740, an adder 755, an incremeter 757, a stop register 760, and an increment and load control device 765. To write data into file 621 for duplex printing, controller 455 resets registers 660 and 730 to "0" and counter 445 and registers 630 and 760 to "1". Since the duplex key is engaged, this disables gate 410 and enables gate 411. Controller 455 also strobes address register 290 to enter into the register the address in memory 57 at which the first byte of data is located and strobes length register 650 to load it with a number indicating the length of the data to be transferred from memory. The memory address and the data length are supplied by the data processor. Since gate 411 is enabled, the strobe also triggers adder 755 after sufficient delay to permit register 650 to be loaded; and, after a further delay to permit the results of the operation of adder 755 and incrementer 757 to be loaded into register 730, the strobe triggers load control device 735. Adder 755 sums the contents of start register 730 and length register 650 and incrementer 757 increases that sum by one and loads the result back into start register 730. Thus, when load control device 735 is activated, the address loaded into address register 431 is the new address formed by adder 755 and incrementer 757.

Next, controller 455 strobes output data register 300 to load into it the data at the address in the memory identified by register 290. Each byte in the unit of data to be stored at the first address in file 621 is then transferred, one byte after the other, into the file in the same fashion as bytes of data are written into file 620. When the complete unit has been transferred, this is detected by detector 680 which produces an output signal that enables comparator 740 for a brief period of time. Comparator 740 compares the address in register 431 with that in stop register 760. If the addresses are not equal, address register 431 is decremented by one. The bytes in the next unit of data are then transferred, one byte after another, in the same fashion as the first unit but into the next lower address in file 621. Thus, each unit of data is stored at an address in memory that is greater than that of the next following unit. With the first unit of data being stored at the address in memory that is farthest removed from that of any previously stored data and each succeeding unit being stored successively closer to the previously stored data.

This continues until the amount of data specified by length register 650 has been transferred to file 621. At that point comparator 740 will find that the address in register 431 equals that in stop register 760. It then creates a new stop address by directing load control device 765 to add one to the address than stored in start register 730 and load the result into stop register 760. Comparator 740 also advises the data processor that it is ready to store additional data.

When the duplex key is engaged, the amount of data specified in length register 650 preferably is the contents of a page. Hence, the end of the page code will be detected as soon as the last byte of data is strobed into files 620, 621. Upon such detection, counter 445 is advanced by one to prepare gates 410, 411 for the writing of the next page, with gate 410 being enabled for writing even pages and gate 411 for writing odd pages.

Upon completion of the writing of an odd page into file 621, detector 440 advances page counter 445 and thereby produces a zero bit in the least significant bit. This enables gate 410 and disables gate 411. An even page may then be written into file 620 in the same fashion as a page is written therein for purposes of simplex printing. As in the case of the apparatus shown in FIG. 10, this process of writing odd pages into file 621 and even pages into file 620 continues until all the pages have been written into one of the two ordered sequences in these files.

Figure 13:
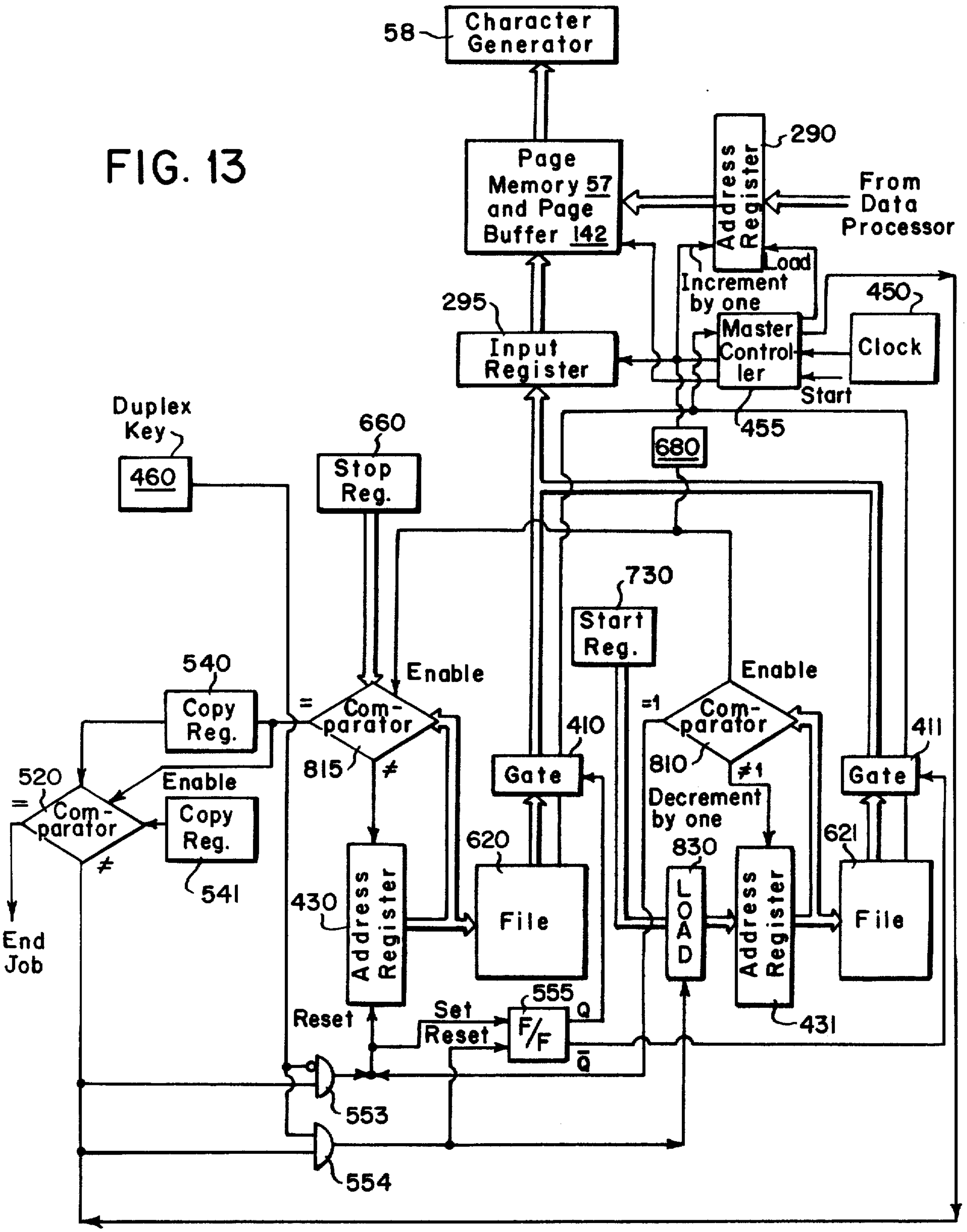

Readout apparatus for files 620, 621 is depicted in FIG. 13. This apparatus comprises gates 410, 411, files 620, 621, address registers 430, 431, clock 450, master controller 455, duplex key 460, and detector 680. It also comprises comparator 520, registers 540, 541 for counting the number of copies made and the number of copies requested, respectively, and logic devices 553, 554, 555. All of the foregoing may be similar in function to those used in apparatus of FIGS. 10 and 11 and accordingly have been assigned the same number. Data read from files 620, 621 are written into input data register 295 from which they are written into page memory 57 and page buffer 142 under the control of address register 290. The data in page memory 57 are used to control character generator 58 in printing images on a recording medium.

The readout apparatus further comprises comparators 810, 815, a control device 830 for loading address register 431, and start register 730 and stop register 660 which were described in FIG. 12. During readout, stop register 660 and start register 730 contain the final addresses that were loaded into these registers during the writing of data into files 620, 621.

For reading data from file 620 for simplex printing, the duplex key is not engaged. Reading starts on a command from the processor to controller 455. The controller resets address register 430 to the first address at which a byte of data is stored and waits until it receives a signal from file 620 that it is ready to transfer data. The signal that resets address register 430 also sets flip-flop 555, thereby enabling gate 410 and disabling gate 411. Since the ready signals are routed through gates 410, 411, a ready signal can only be received from file 620. When it receives the ready signal, controller 455 strobes input data register 295 to write the first byte of data into register 295 and then strobes address register 290 to load the initial address at which the data from file 620 are to be stored. This address is supplied by the data processor. Controller 455 then strobes memory 140 to load the byte of data in register 295 into the memory at the address specified by register 290.

The controller then monitors file 620 to determine if it is ready to transfer another byte of data. When it is, it strobes input data register 295 to write the next byte of data into that register and increments memory address register 290 by one to point to the next address in memory. Controller 455 then strobes memory 140 to write this byte of data into that address in memory. In this fashion, a unit of data stored in file 620 is read out byte by byte. When the end of the unit is reached, this is detected by detector 680 which enables comparator 815 for a brief interval to compare the address then in register 430 with the highest address of the data in file 620, which address is stored in stop register 660. If they are not equal, it increments address register 430 and the readout apparatus reads the next unit. Thus the unit of data and the pages stored in file 620 are read out and written into memory in the same order in which they were received by the writing apparatus of FIG. 12 during the writing of the pages into file 620. Eventually, the address in register 430 will be incremented enough to equal the address in stop register 660. At this point, comparator 815 increments register 540 by one, signifying the completion of one set of pages to be printed. Comparator 815 also activates comparator 520 for a brief period of time to compare the count in register 540 with the number of copies requested which is stored in register 541. If this number is equal, the job is ended. If it is not equal, comparator 520 applies a signal via AND gate 553 to register 430 to reset it to its initial address and begin reading file 620 anew. This signal is also applied to the set input of flip-flop 555, which does not change its output and therefore continues to enable gate 410. When reset is complete, comparator 520 is disabled.

To read data from files 620 and 621 for duplex printing, duplex key 460 is activated. This enables AND gate 554 and disables AND gate 553. Reading starts on a command from the data processor to controller 455. The controller operates load control device 830 to load into address register 431 the address stored in start register 730, which was the last address used during writing. Thus, duplex reading begins with the highest numbered address at which data are stored in file 621. The signal to control device 530 is also applied to the reset input of flip-flop 555 thereby disabling gate 410 and enabling gate 411.

Controller 455 then waits until it receives a signal from file 621 that it is ready to transfer data. When it receives the ready signal, the controller strobes input data register 295 to write the first byte of data into register 295. It then loads in memory address register 290 the initial address at which the data from file 421 are to be stored. Controller 455 then strobes memory 140 to load the byte of data in register 295 into the memory at the address specified by register 290. The transfer of data continues as in simplex printing, byte by byte, until the unit of data is read out. When the end of the unit is reached, this is detected by detector 680 which enables comparator 810 for a brief interval to read the address then in register 431 into the comparator. If this address is not equal to the lowest address at which data is stored in file 621, which illustratively is "1", comparator 810 decrements the address register by one and the readout apparatus reads the next lower address in file 621. Thus, the pages stored in file 621 are read out in the page order opposite that in which they were received by the writing apparatus of FIG. 12 during the writing of pages into file 621. Since the pages that are read are written directly into memory and printed therefrom, the page order in which they are written into memory and printed is likewise opposite that in which they were received during the writing of file 621. However, within each page, the order in which the units of data are read from file 621 is the same as that in which they were received during the writing of file 621 since the units associated with each page were written into the file commencing with the highest address needed and working down. When the address in register 431 is "1", comparator 810 produces a signal which resets address register 430 to the initial address in file 620 and commences reading of that file into output register 295. This signal is also applied to the set input of flip-flop 555, thereby enabling gate 410 and disabling gate 411.

The reading of file 620 is the same as that in simplex printing. Thus, the pages stored in file 620 are read out, written into memory and printed in the same order in which they were received by the writing apparatus of FIG. 12 during the writing of the pages into file 620.

When the entire file has been read into register 295, the output of comparator 815 increments copy register 540 and enables comparator 520 to compare the number of copies made with the number of copies requested as recorded in register 541. If this number is equal, the job is ended. If it is not, a signal is routed via AND gate 554 to load control 830 to enter into register 431 the address stored in start register 730. This signal is also applied to the reset input of flip-flop 555, thereby enabling gate 411 and disabling gate 410. As a result, the printing operation begins anew reading file 421 in a direction opposite that in which the file was written.

From the foregoing discussion it will be evident that our invention may be practiced in numerous forms. While we have set forth examples in which odd pages are stored in one sequence and even pages in another, it will be apparent that it is only necessary in practicing our invention to store in one sequence the pages to be printed on one side of the recording medium and to store in a second sequence the pages to be printed on the other side of the recording medium. Likewise, with suitable modifications in the paper feed path our invention can be practiced to print a continuous web of recording medium in duplex and produce collated sheets therefrom.

To teach our invention more clearly, we have eliminated from the program set forth in Appendix A and from the apparatus of FIGS. 11–13 numerous conventional techniques and details well known to those skilled in the art. The specific program and apparatus disclosed are only meant to be illustrative of the concepts of our invention. Numerous modifications to the program set forth in Appendix A will be apparent to those skilled in the art. Numerous alternatives to the specific apparatus set forth in FIGS. 10–13 will likewise be apparent to those skilled in the art. It is to be expressly understood that the specific methods and apparatus set forth herein are only illustrative and are not intended to limit the appended claims.

We claim:

1. An electronic printer operable to print images on both sides of a recording medium in response to electrical signals representative of said images which are received at said printer, said electronic printer comprising printing means for forming an image on the recording medium as the recording medium is fed through the printer, means for controlling said printing means in response to said electrical signals to form on said recording medium an image represented by said electrical signals, a memory for storing electrical signals representative of said images that are received at said printer;

a last-in first-out (LIFO) receptacle for temporary storage for the recording medium printed on one side prior to its being printed on a second side, means for forming in said memory a first ordered sequence of the electrical signals representative of the pages to be printed on one side of the recording medium and a second ordered sequence of the electrical signals representative of the pages to be printed on the other side of the recording medium, and means for writing the electrical signals in one of said sequences and then the other at least once into said control means, the first of said ordered sequences that is written being used to form images on one side of the recording medium fed through the printer into the LIFO receptacle and the second of said sequences that is written being used to form images of the other side of the recording medium fed through the printer from the LIFO receptacle, one of said ordered sequences being written into said control means in ascending page order and the other in descending page order.

2. The printer of claim 1 wherein the recording medium is discrete sheets of paper on each side of which one page can be printed.

3. The printer of claim 1 wherein the recording medium is in the form of discrete sheets on each side of which one page can be printed and the sheets stored in the LIFO receptacle are stored printed side up.

4. The printer of claim 1 further comprising an output receptacle in which the most recently printed sheet is stored uppermost in a stack of printed sheets.

5. The printer of claim 4 in which the first of the ordered sequences that is written into said control means is the first ordered sequence and said sequence is written in a descending page order, said printer further comprising means for turning over each sheet between the time it is printed on its second side and the time it is entered into the output receptacle.

6. The printer of claim 1 wherein the electrical signals representative of said images are manipulated by the printer in units of a fixed size which typically is less than that required to represent an entire page, said units being ordered within each page in the order in which they are received by said printer, said printer further comprising means for reading the units in the first and second ordered sequences in the same order within each page.

7. The printer of claim 6 wherein the means for reading the units further comprises means for reading said units in the same order as the order in which they are received at the printer.

8. The printer of claim 1 wherein:

the memory is organized into a series of consecutive addresses for the storage of data and the electrical signals representative of said images are manipulated by the printer in units of a fixed size which typically is less than that required to represent an entire page, said units being ordered within each page in the order in which they are received by said printer, said means for forming a first and a second ordered sequence further comprising means for storing the units of electrical signals for each page in one ordered sequence in said memory in their order within each page commencing at a first memory address and proceeding to a last memory address greater than the first address, and means for storing the units of data signals for each page in the other ordered sequence in said memory in their order within each page, commencing at a first memory address and proceeding to a last memory address less than said first memory address.

9. The printer of claim 8 further comprising means for determining the number of units in each page of said other ordered sequence and for storing the first unit of each said page at a memory address that is at least that far removed from data previously stored and for storing successive units of each said page successively closer to any previously stored data.

10. The printer of claim 1 wherein:

the memory is organized into a series of consecutive addresses for the storage of data, and the electrical signals representative of said images are manipulated by the printer in units of a fixed size which typically is less than that required to represent an entire page, said units being ordered within each page in the order in which they are received by said printer, said means for forming a first and a second ordered sequence further comprising means for storing the first unit of each page in one of said ordered sequences at a memory address that is removed from data previously stored and for storing successive units of each said page successively closer to any previously stored data.

11. The printer of claim 10 further comprising means for determining the number of units in each page in said one of the ordered sequences and for storing the first unit of each page in said sequence at least that far removed from data previously stored.

12. The printer of claim 1 wherein the memory is a disc storage unit in which data are recorded on a plurality of tracks and the pages in the two ordered sequences are stored on different tracks with the pages of one ordered sequence being pushed to the back of each track on which they are stored and the pages of the other ordered sequence being pushed to the front of each track on which they are stored.

13. The printer of claim 1 wherein the memory is a disc storage unit in which data are recorded on a plurality of tracks, each of which includes at least a first and last sector thereon, and the pages in the two ordered sequences are stored on different tracks, and the electrical signals representative of said images are manipulated by the printer in units of a fixed size which typically is less than that required to represent an entire page, said units being ordered within each page in the order in which they are received by said printer, said means for forming a first and a second ordered sequence further comprising:

means for storing the pages of one ordered sequence so that the first unit of the first page of the sequence is stored in the first sector of the first track where said sequence is stored and subsequent units follow immediately thereafter in the order in which they are received by the printer with the same order being maintained on any subsequent tracks as well; and means for storing the pages of the other ordered sequence so that the first unit of the first page in said sequence is stored at that sector in the track such that the last unit in the page is stored in the last sector of the first track where said sequence is stored and subsequent pages are stored in the same fashion with the last unit of each page being stored in the sector preceeding the first unit of the previous page.

14. The printer of claim 13 wherein the different tracks on which said one and said other ordered sequences are stored are linked together, said printer further comprising means for reversing the linkage between the tracks which store said other ordered sequence after said other ordered sequence is written into the disc storage unit and before it is read therefrom to be written into said control means.

15. The printer of claim 1 wherein said means for forming said first and second ordered sequences comprises means for writing into a first portion of said memory electrical signals representative of every other page and into a second portion of said memory electrical signals representative of the remaining pages.

16. The printer of claim 1 wherein the signals representative of each page are received at the memory in numerical page order and are written therein and said writing means comprises means for writing one of said ordered sequences into said control means in a page order opposite that in which it was received at said memory during the writing of the electrical signals in said sequence into memory.

17. The printer of claim 1 further comprising means, responsive to an instruction to print multiple sets of pages on one side of the recording medium, for loading electrical signals representative of each page into said memory in numerical page order and for writing the electrical signals in said memory at least once into said control means so as to form on the recording medium fed through the printer to an output receptacle the images represented by said electrical signals.

18. The printer of claim 1 wherein odd pages are stored in the first ordered sequence and even pages in the second ordered sequence and the first sequence is written into said control means from the highest numbered odd page to the lowest numbered odd page and the second ordered sequence is read thereafter from the lowest numbered even page to the highest numbered even page.

19. The electronic printer of claim 1 further comprising means for generating a blank page for writing at the end of one of the ordered sequences whenever the total number of pages received at the electronic printer is an odd number.

20. In an electronic printer operable to print images on both sides of a recording medium in response to electrical signals representative of said images which are received at said printer, a memory for storing said electrical signals, image forming means responsive to said electrical signals to print images on said recording medium, control means operatively associated with said image forming means and said memory to sequentially transfer said electrical signals therebetween, a LIFO receptacle for temporarily storing single-imaged ones of said recording media;

the improvement including in combination:

means for forming in said memory a first ordered sequence of the electrical signals representative of the pages to be printed on one side of the recording medium and a second ordered sequence of the electrical signals representative of the pages to be printed on the other side of the recording medium, and means for writing the electrical signals in one of said sequences and then the other at least once into said control means, the first of said ordered sequences that is written being used to form images on one side of the recording medium fed through the printer into the LIFO receptacle and the second of said sequences that is written being used to form images on the other side of the recording medium fed through the printer from the LIFO receptacle, one of said ordered sequences being written into said control means in ascending page order and the other in descending page order.

21. The apparatus of claim 20 wherein the electrical signals representative of said images are manipulated by the printer in units of a fixed size which typically is less than that required to represent an entire page, said units being ordered within each page in the order in which they are received by said printer, said apparatus further comprising means for reading the units in the first and second ordered sequences in the same order within each page.

22. The apparatus of claim 21 wherein the means for reading the units further comprises means for reading said units in the same order as the order in which they are received at the printer.

23. The apparatus of claim 20 wherein:

the memory is organized into a series of consecutive addresses for the storage of data and the electrical signals representative of said images are manipulated by the printer in units of a fixed size which typically is less than that required to represent an entire page, said units being ordered within each page in the order in which they are received by said printer, said means for forming a first and a second ordered sequence further comprising means for storing the units of electrical signals for each page in one ordered in said memory in their order within each page commencing at a first memory address and proceeding to a last memory address greater than the first address, and means for storing the units of data signals for each page in the other ordered sequence in said memory in their order within each page, commencing at a first memory address and proceeding to a last memory address less than said first memory address.

24. The apparatus of claim 22 further comprising means for determining the number of units in each page of said second ordered sequence and for storing the first unit of each said page at a memory address that is at least that far removed from data previously stored and for storing successive units of each said page successively closer to any previously stored data.

25. The apparatus of claim 20 wherein:

the memory is organized into a series of consecutive addresses for the storage of data, and the electrical signals representative of said images are manipulated by the printer in units of a fixed size which typically is less than that required to represent an entire page, said units being ordered within each page in the order in which they are received by said printer, said means for forming a first and a second ordered sequence further comprising means for storing the first unit of each page in one of said ordered sequences at a memory address that is removed from data previously stored and for storing successive units of each said page successively closer to any previously stored data.

26. The apparatus of claim 25 further comprising means for determining the number of units in each page in said one of the ordered sequences and for storing the first unit of each page in said sequence at least that far removed from data previously stored.

27. The apparatus of claim 20 wherein the memory is a disc storage unit in which data are recorded on a plurality of tracks and the pages in the two ordered sequences are stored on different tracks with the pages of one ordered sequence being pushed to the back of each track on which they are stored and the pages of the other ordered sequence being pushed to the front of each track on which they are stored.

28. The apparatus of claim 20 wherein the memory is a disc storage unit in which data are recorded on a plurality of tracks, each of which includes at least a first and last sector thereon, and the pages in the two ordered sequences are stored on different tracks, and the electrical signals representative of said images are manipulated by the printer in units of a fixed size which typically is less than that required to represent an entire page, said units being ordered within each page in the order in which they are received by said printer, said means for forming a first and a second ordered sequence further comprising:

means for storing the pages of one ordered sequence so that the first unit of the first page of the sequence is stored in the first sector of the first track where said sequence is stored and subsequent units follow immediately thereafter in the order in which they are received by the printer with the same order being maintained on any subsequent tracks as well; and means for storing the pages of the other ordered sequence so that the first unit of the first page in said sequence is stored at that sector in the track such that the last unit in the page is stored in the last sector of the first track where said sequence is stored and subsequent pages are stored in the same fashion with the last unit of each page being stored in the sector preceeding the first unit of the previous page.

29. The apparatus of claim 28 wherein the different tracks on which said one and said other ordered sequences are stored are linked together, said printer further comprising means for reversing the linkage between the tracks which store said other ordered sequence after said other ordered sequence is written into the disc storage unit and before it is read therefrom to be written into said control means.

30. The printer of claim 20 wherein said means for forming said first and second ordered sequences comprises means for writing into a first portion of said memory electrical signals representative of every other page and into a second portion of said memory electrical signals representative of the remaining pages.

31. The printer of claim 20 wherein the signals representative of each page are received at the memory in numerical page order and are written therein and said writing means comprises means for writing one of said ordered sequences into said control means in a page order opposite that in which it was received at said memory during the writing of the electrical signals in said sequence into memory.

32. In an electronic printer operable to print images on both sides of a recording medium in response to electrical signals representative of said images which are received at said printer in numerical page order, said electronic printer comprising printing means for forming an image on the recording medium as the recording medium is fed through the printer, means for controlling said printing means in response to said electrical signals to form on said recording medium an image represented by said electrical signals, a memory for storing electrical signals representative of said images that are received at said printer, and a last-in first-out (LIFO) receptacle for temporary storage of the recording medium printed on one side prior to its being printed on a second side, the method of operating said printer comprising the steps of:

forming in said memory a first ordered sequence of the electrical signals representative of the pages to be printed on one side of the recording medium, and a second ordered sequence of the electrical signals representative of the pages to be printed on the other side of the recording medium; and writing the electrical signals in one of said sequences and then the other at least once into said control means, the first of said ordered sequences that is written being used to form images on one side of the recording medium fed through the printer into the LIFO receptacle and the second of said sequences that is written being used to form images on the other side of the recording medium fed through the printer from the LIFO receptacle, one of said ordered sequences being written into said control means in ascending page order and the other in descending page order.

33. The method of claim 32 wherein the electrical signals representative of said images are manipulated by the printer in units of a fixed size which typically is less than that required to represent an entire page, said units being ordered within each page in the order in which they are received by said printer, said method further comprising the step of reading the units in the first and second ordered sequences in the same order within each page.

34. The method of claim 33 wherein said units are read in the same order as the order in which they are received at the printer.

35. The method of claim 32 wherein:

the memory is organized into a series of consecutive addresses for the storage of data and the electrical signals representative of said images are manipulated by the printer in units of a fixed size which typically is less than that required to represent an entire page, said units being ordered within each page in the order in which they are received by said printer, said step of forming first and second ordered sequences further comprising the steps of storing the units of electrical signals for each page in one ordered sequence in said memory in their order within each page commencing at a first memory address and proceeding to a last memory address greater than the first address, and storing the units of data signals for each page in the other ordered sequence in said memory in their order within each page, commencing at a first memory address and proceeding to a last memory address less than said first memory address.

36. The method of claim 35 further comprising the steps of determining the number of units in each page of said other ordered sequence, storing the first unit of each said page at a memory address that is at least that far removed from data previously stored, and storing successive units of each said page successively closer to any previously stored data.

37. The method of claim 32 wherein:

the memory is organized into a series of consecutive addresses for the storage of data, and the electrical signals representative of said images are manipulated by the printer in units of a fixed size which typically is less than that required to represent an entire page, said units being ordered within each page in the order in which they are received by said printer, said step of forming first and second ordered sequences further comprising the steps of storing the first unit of each page in one of said ordered sequences at a memory address that is removed from data previously stored and storing successive units of each said page successively closer to any previously stored data.

38. The method of claim 37 further comprising the steps of determining the number of units in each page in said one of the ordered sequences and storing the first unit of each page in said sequence at least that far removed from data previously stored.

39. The method of claim 32 wherein the memory is a disc storage unit in which data are recorded on a plurality of tracks and the pages in the two ordered sequences are on different tracks said step of forming a first and a second ordered sequence further comprising the step of stroring the pages with the pages of one ordered sequence being pushed to the back of each track on which they are stored and the pages of the other ordered sequence being pushed to the front of each track on which they are stored.

40. The method of claim 32 wherein the memory is a disc storage unit in which data are recorded on a plurality of tracks, each of which includes at least a first and last sector thereon, and the pages in the two ordered sequences are stored on different tracks, and the electrical signals representative of said images are manipulated by the printer in units of a fixed size which typically is less than that required to represent an entire page, said units being ordered within each page in the order in which they are received by said printer, said step of forming a first and a second ordered sequence further comprising the steps of:

storing the pages of one ordered sequence so that the first unit of the first page of the sequence is stored in the first sector of the first track where said sequence is stored and subsequent units follow immediately thereafter in the order in which they are received by the printer with the same order being maintained on any subsequent tracks as well; and storing the pages of the other ordered sequence so that the first unit of the first page in said sequence is stored at that sector in the track such that the last unit in the page is stored in the last sector of the first track where said sequence is stored and subsequent pages are stored in the same fashion with the last unit of each page being stored in the sector preceeding the first unit of the previous page.

41. The method of claim 40 wherein the different tracks on which said one and said other ordered sequences are stored are linked together, said method further comprising the step of reversing the linkage between the tracks which store said other ordered sequence after said other ordered sequence is written into the disc storage unit and before it is read therefrom to be written into said control means.

42. The method of claim 32 wherein said step of forming said first and second ordered sequences comprises the step of writing into a first portion of said memory electrical signals representative of every other page and into a second portion of said memory electrical signals representative of the remaining pages.

43. The method of claim 35 wherein the signals representative of each page are received at the memory in numerical page order and are written therein and said step of writing said signals into said control means comprises the step of writing one of said ordered sequences into said control means in a page order opposite that in which it was received at said memory during the writing of the electrical signals in said sequence into memory.

44. In a copy production machine having a copy production portion for printing, on both sides of copy sheets, images received as electrical signals;

the combination of:

means for serially receiving image indicating electrical signals, first and second memory means, and means for storing said received signals alternately in said first and second memory means, and means for retrieving the stored signals from said first memory means for supplying said retrieved signals to said copy production portion for first printing all one side of said copy sheets and then secondly retrieving stored signals from said second memory means to then print another side of said copy sheets; means for reversing the order of retrieval with respect to the order of receipt for signals stored in one of said memory means, and including means for supplying said retrieved signals to said copy production portion whereby successively received image-indicating signals result in images printed on one copy sheet.

45. The copy production machine set forth in claim 44 further including an interim storage unit for storing partially imaged copy sheets, means for directing copy sheets having one side printed to said interim storage unit in the order of printing, and means for fetching said one side printed copy sheets from said interim storage unit in reverse order of said one side printing for receiving images in said copy production portion based on image-indicating signals fetched from said second memory means.

46. The copy production machine set forth in claim 45 wherein a disc storage apparatus rotating in a first direction having a plurality of addressable locations in a fixed sequence of addresses constitutes both said memory means, one of said memory means including addresses for said image indicating electrical signals arranged in a first sequence of said addresses and a second of said memory means including addresses arranged in a reverse sequence with respect to the order of addresses in said first sequence whereby incrementing addresses enables fetching said image sets from said respective memory means in oppositely ordered sequences.

47. The method of producing duplex prints based upon image sets of electrical image sets of electrical image-indicating signals as a plurality of collated print sets;

the steps of:

arranging said image sets in a memory into two groups, a first group containing signals representing images to be printed on a a first side of copy sheets, a second group containing signals representing images to be printed on a second side of copy sheets, all of said image sets representing images on one collated copy set;

printing all first sides of each collated copy set from signals in said first group in a first ordered sequence;

printing all second sides of each collated set from signals in said second group in a second ordered sequence; and one of said ordered sequences being in an ascending numerical page order sequence and a second one of said ordered sequences being in a descending numerical page order sequence.

* * * * *

UNITED STATES PATENT AND TRADEMARK OFFICE

CERTIFICATE OF CORRECTION

PATENT NO. : 4,099,254

DATED : July 4, 1978

INVENTOR(S) : D. R. Andrews et al

It is certified that error appears in the above-identified patent and that said Letters Patent are hereby corrected as shown below:

Column 9, line 54, insert the following table after line 54:

| I | II | III | IV | V |
|---|---|---|---|---|
| | | EXAMPLE 1 | | |
| 3<br>1 | page 1 / blank | 2<br>4 | page 4 / page 3 | page 3 / page 4 |
| | page 3 / blank | | page 2 / page 1 | page 1 / page 2 |
| | | EXAMPLE 2 | | |
| 2<br>4 | page 4 / blank | 3<br>1 | page 1 / page 2 | page 2 / page 1 |
| | page 2 / blank | | page 3 / page 4 | page 4 / page 3 |
| | | EXAMPLE 3 | | |
| 1<br>3 | page 3 / blank | 4<br>2 | page 2 / page 1 | page 1 / page 2 |
| | page 1 / blank | | page 4 / page 3 | page 3 / page 4 |
| | | EXAMPLE 4 | | |
| 4<br>2 | page 2 / blank | 1<br>3 | page 3 / page 4 | page 4 / page 3 |
| | page 4 / blank | | page 1 / page 2 | page 2 / page 1 |

UNITED STATES PATENT AND TRADEMARK OFFICE

CERTIFICATE OF CORRECTION

PATENT NO. : 4,099,254 Page 2 of 2

DATED : July 4, 1978

INVENTOR(S) : D. R. Andrews et al

It is certified that error appears in the above-identified patent and that said Letters Patent are hereby corrected as shown below:

Column 3, line 39, after "high", insert --energy--.

Column 4, line 67, after "application", delete "now U.S. Pat. No. 4,000,486".

Column 5, line 1, after "application", insert --now U.S. Pat. No. 4,000,486--.

Column 28, line 60, after "ordered", insert --sequence--.

Signed and Sealed this

*Sixth* Day of *February 1979*

[SEAL]

*Attest:*

RUTH C. MASON
*Attesting Officer*

DONALD W. BANNER
*Commissioner of Patents and Trademarks*